(12) United States Patent
Byington et al.

(10) Patent No.: US 11,443,274 B2
(45) Date of Patent: Sep. 13, 2022

(54) MANAGING SECURE TRANSACTIONS BETWEEN ELECTRONIC DEVICES AND SERVICE PROVIDERS

(71) Applicant: Apple Inc., Cupertino, CA (US)

(72) Inventors: Matthew C. Byington, Sunnyvale, CA (US); Christopher Sharp, Sunnyvale, CA (US); Yousuf H. Vaid, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 9 days.

(21) Appl. No.: 15/620,305

(22) Filed: Jun. 12, 2017

(65) Prior Publication Data

US 2017/0357936 A1    Dec. 14, 2017

Related U.S. Application Data

(60) Provisional application No. 62/349,003, filed on Jun. 12, 2016.

(51) Int. Cl.
*G06Q 10/08* (2012.01)
*G06Q 20/32* (2012.01)
(Continued)

(52) U.S. Cl.
CPC ....... *G06Q 10/087* (2013.01); *G06Q 20/3278* (2013.01); *G06Q 20/382* (2013.01); *H04L 9/085* (2013.01)

(58) Field of Classification Search
CPC ......... G06Q 10/063114; G06Q 20/322; G06Q 30/04; G06Q 20/20; G06Q 20/3274; G06Q 20/12; G06Q 20/326; G06Q 20/42
See application file for complete search history.

(56) References Cited

U.S. PATENT DOCUMENTS

| | | | | |
|---|---|---|---|---|
| 5,892,900 A | * | 4/1999 | Ginter | G06F 21/10 726/26 |
| 7,631,318 B2 | * | 12/2009 | Cottrille | H04L 63/0823 719/328 |
| 7,706,786 B2 | * | 4/2010 | Natsuno | G06F 21/10 455/418 |

(Continued)

FOREIGN PATENT DOCUMENTS

| JP | H-113387 A | 1/1999 |
|---|---|---|
| JP | 2000-174797 A | 6/2000 |

(Continued)

OTHER PUBLICATIONS

Wikipedia, "Symmetric-key algorithm" Jun. 7, 2016, 3 pages, https://en.wikipedia.org/w/index.php/?title=Symmetric-key_algorithm &oldid=724133770.

(Continued)

*Primary Examiner* — Peter Ludwig
(74) *Attorney, Agent, or Firm* — BakerHostetler

(57) ABSTRACT

Systems, methods, and computer-readable media for managing secure transactions between electronic devices and service providers. In one embodiment, an administration entity system may receive device order data from an electronic device, wherein the received device order data is indicative of an order for an item of value of a service provider system to be stored on the electronic device, transmit administration order data to the service provider system based on the received device order data, wherein the administration order data is indicative of the order for the item of value, receive service provider fulfillment data from the service provider system based on the transmitted administration order data, wherein the service provider fulfillment data includes the item of value, and transmit administration fulfillment data to the electronic device based on the (Continued)

received service provider fulfillment data, wherein the administration fulfillment data includes the item of value.

20 Claims, 8 Drawing Sheets

(51) Int. Cl.
   *G06Q 20/38* (2012.01)
   *H04L 9/08* (2006.01)

(56) References Cited

U.S. PATENT DOCUMENTS

| | | | | |
|---|---|---|---|---|
| 8,364,951 | B2* | 1/2013 | Peterka | H04L 63/062 |
| | | | | 380/279 |
| 9,106,633 | B2* | 8/2015 | Carnes | H04L 9/3234 |
| 9,124,650 | B2* | 9/2015 | Maharajh | G06F 21/10 |
| 9,225,710 | B2* | 12/2015 | Taveau | G06Q 20/3278 |
| 9,521,147 | B2* | 12/2016 | Barton | H04L 41/00 |
| 9,836,702 | B2* | 12/2017 | Hinton | G06F 21/33 |
| 9,973,375 | B2* | 5/2018 | Shatzkamer | G06F 9/455 |
| 2005/0144142 | A1 | 6/2005 | Takayama | |
| 2012/0143706 | A1* | 6/2012 | Crake | G06Q 20/206 |
| | | | | 705/18 |
| 2012/0215693 | A1* | 8/2012 | Faith | G06Q 20/027 |
| | | | | 705/44 |
| 2013/0151400 | A1* | 6/2013 | Makhotin | G06Q 20/3227 |
| | | | | 705/39 |
| 2015/0019443 | A1* | 1/2015 | Sheets | G06Q 20/3278 |
| | | | | 705/71 |
| 2015/0026781 | A1* | 1/2015 | Taveau | G06Q 20/326 |
| | | | | 726/5 |

FOREIGN PATENT DOCUMENTS

| | | |
|---|---|---|
| JP | 2001-344524 A | 12/2001 |
| JP | 2002-368730 A | 12/2002 |
| JP | 2004-355085 A | 12/2004 |
| JP | 2007-258789 A | 10/2007 |
| JP | 2009-042933 A | 2/2009 |
| JP | 2010-113462 A | 5/2010 |
| JP | 2016-513317 A | 5/2016 |
| WO | 2005/011192 | 2/2005 |

OTHER PUBLICATIONS

European Office Action from European Patent Application No. 17175207.4, dated May 14, 2020, 11 pages.
European Summons to Attend Oral Proceedings from European Patent Application No. 17175207.4, dated Jun. 14, 2021, 18 pages.
Japanese Office Action from Japanese Patent Application No. 2019-022277, dated Aug. 30, 2021, 14 pages including English language translation.
Japanese Office Action from Japanese Patent Application No. 2019-022277, dated Jun. 22, 2022, 8 pages including English language translation.

* cited by examiner

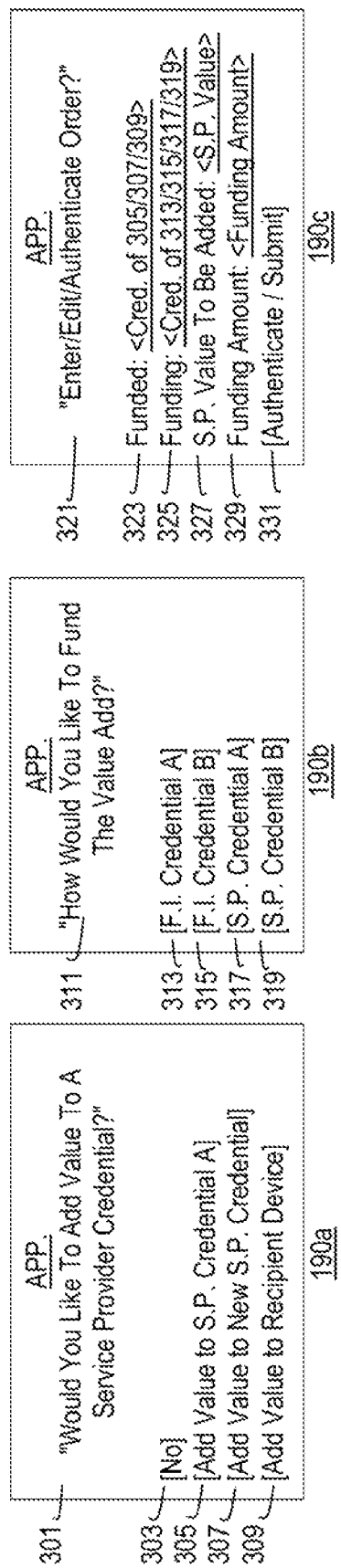
FIG. 3A
FIG. 3B
FIG. 3C
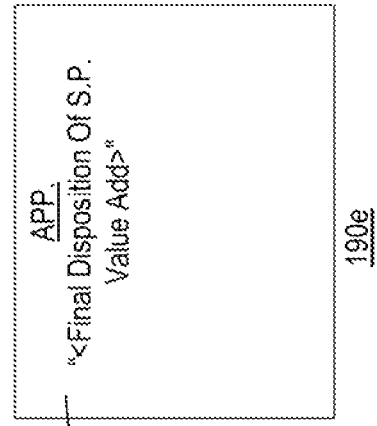
FIG. 3E
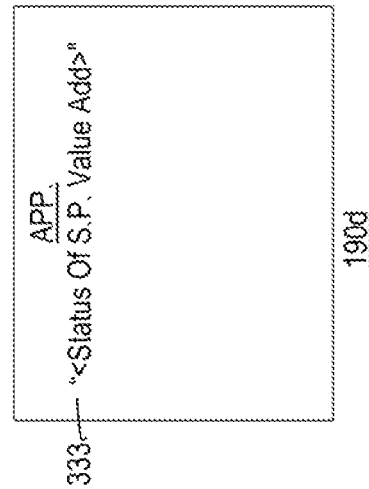
FIG. 3D

MANAGING SECURE TRANSACTIONS BETWEEN ELECTRONIC DEVICES AND SERVICE PROVIDERS

CROSS-REFERENCE TO RELATED APPLICATION(S)

This application claims the benefit of prior filed U.S. Provisional Patent Application No. 62/349,003, filed Jun. 12, 2016, which is hereby incorporated by reference herein in its entirety.

TECHNICAL FIELD

This disclosure relates to managing secure transactions between electronic devices and service providers.

BACKGROUND OF THE DISCLOSURE

A portable electronic device (e.g., cellular telephone) may be provided with a secure element for storing and/or generating credential data that may be used for conducting a transaction with a service provider in exchange for a good or service. However, secure authorization and management of such a transaction is often ineffective or inefficient.

SUMMARY OF THE DISCLOSURE

This document describes systems, methods, and computer-readable media for managing secure transactions between electronic devices and service providers.

As an example, a method, at an administration entity subsystem, may include receiving, from an electronic device, device order data indicative of an order for an item of value of a service provider subsystem to be stored on the electronic device, transmitting, to the service provider subsystem, administration order data that includes at least a portion of the device order data indicative of the order, receiving, from the service provider subsystem, order status update data indicative of a status of the fulfillment of the order for the value by the service provider subsystem, and verifying the received order status update data using a shared secret of the administration entity and the service provider subsystem.

As another example, an administration entity system in communication with a service provider system and an electronic device may include at least one processor component, at least one memory component, and at least one communications component, wherein the administration entity system is configured to receive device order data from the electronic device, wherein the received device order data is indicative of an order for an item of value of the service provider system to be stored on the electronic device, transmit administration order data to the service provider system based on the received device order data, wherein the administration order data is indicative of the order for the item of value, receive service provider fulfillment data from the service provider system based on the transmitted administration order data, wherein the service provider fulfillment data includes the item of value, and transmit administration fulfillment data to the electronic device based on the received service provider fulfillment data, wherein the administration fulfillment data includes the item of value.

As yet another example, a product may include a non-transitory computer-readable medium and computer-readable instructions, stored on the non-transitory computer-readable medium, that, when executed, are effective to cause a computer to receive, from a source electronic device, device order data indicative of an order for an item of value of a service provider system to be stored on a target electronic device, transmit, to the service provider system, authorization order data that includes at least a portion of the device order data indicative of the order, in response to the transmitted authorization order data, receive, from the service provider system, service provider fulfillment data that includes the item of value, and transmit, to the target electronic device, at least the item value of the received service provider fulfillment data.

This Summary is provided only to present some example embodiments, so as to provide a basic understanding of some aspects of the subject matter described in this document. Accordingly, it will be appreciated that the features described in this Summary are only examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters refer to like parts throughout, and in which:

FIGS. 3A-3E are front views of screens of a graphical user interface of at least one electronic device of one or more of FIGS. 1-3 illustrating processes for managing secure transactions;

DETAILED DESCRIPTION OF THE DISCLOSURE

Figure 1:
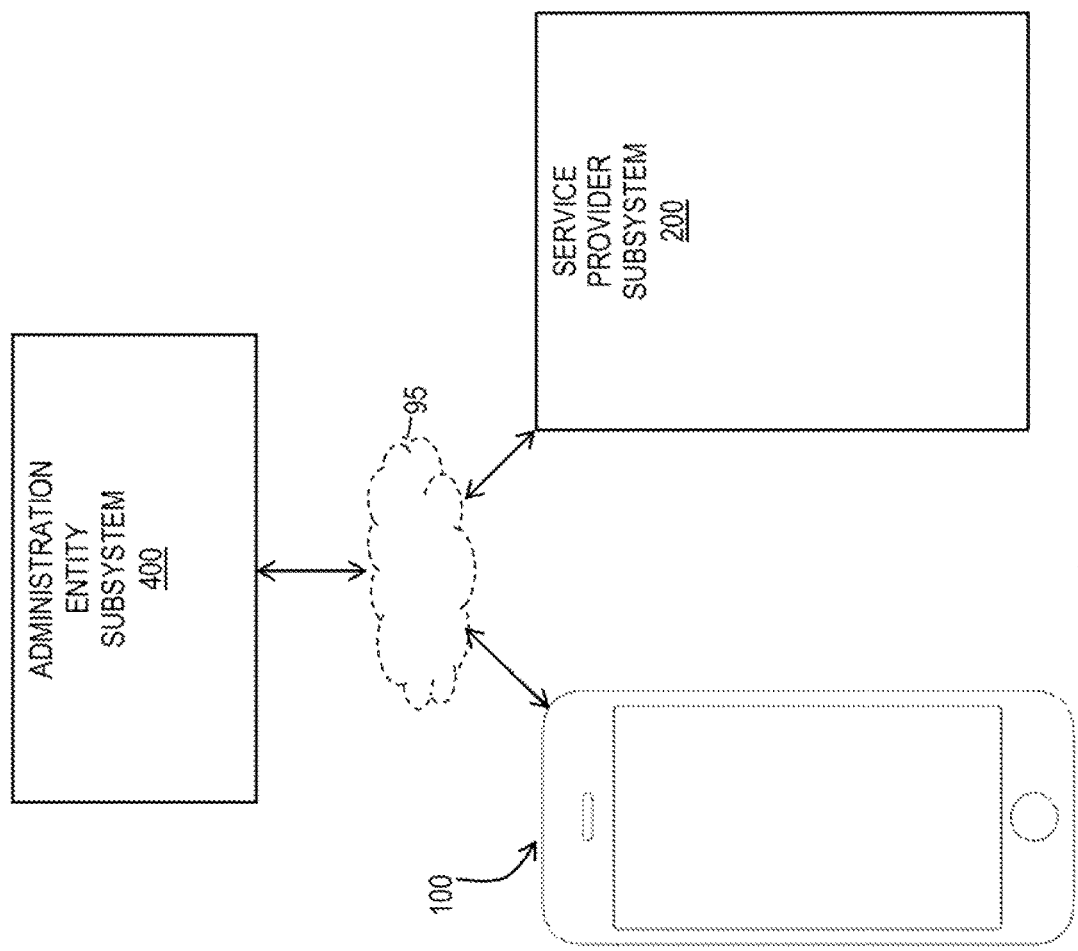
FIG. 1 is a schematic view of an illustrative system for managing secure transactions.
Figure 1A:
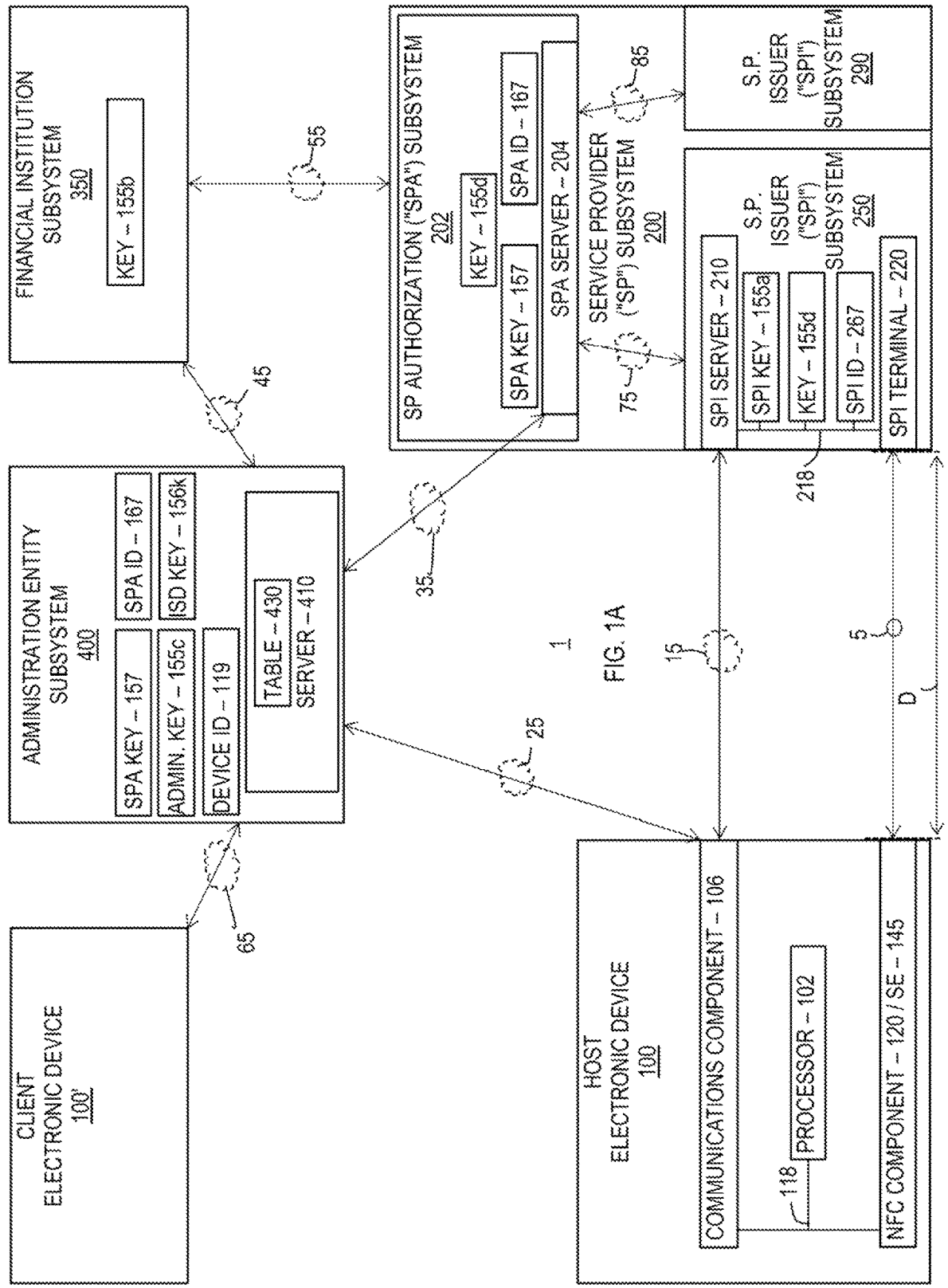
FIG. 1A is a more detailed schematic view of the illustrative system of FIG. 1.
Figure 2:
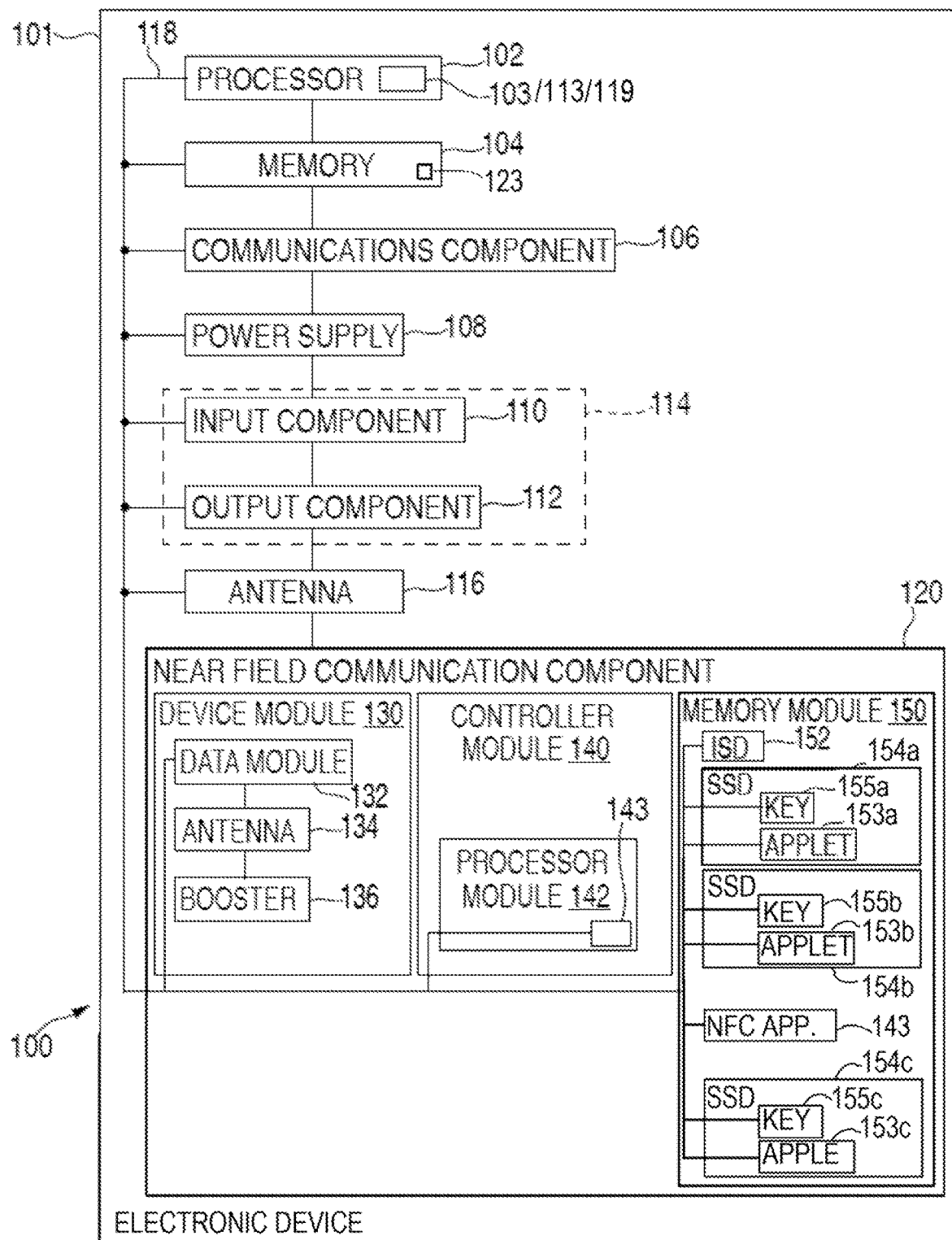
FIG. 2 is a more detailed schematic view of an example electronic device of the system of FIGS. 1 and 1A.
Figure 3:
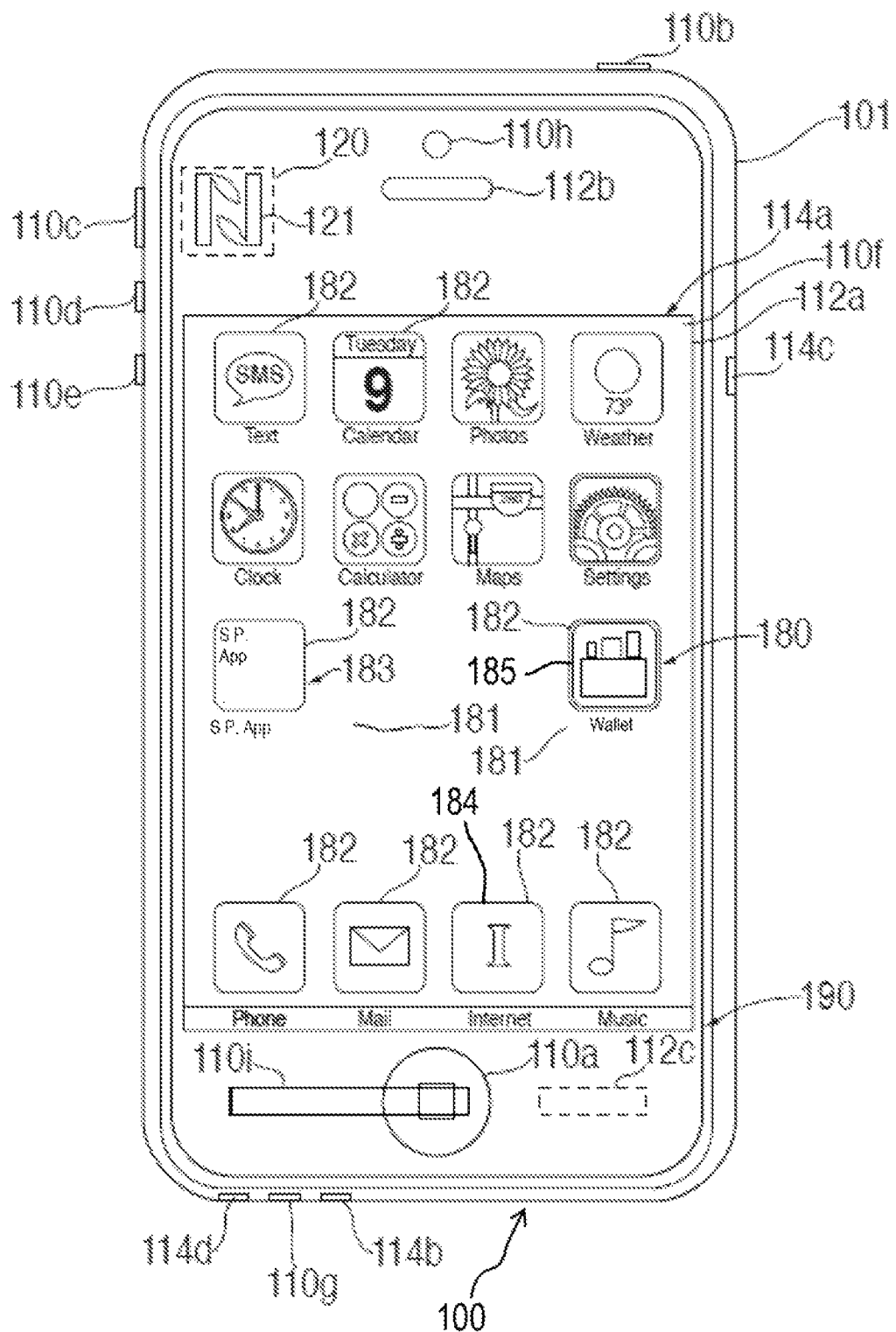
FIG. 3 is a front view of the example electronic device of FIGS. 1-2.
Figure 4:
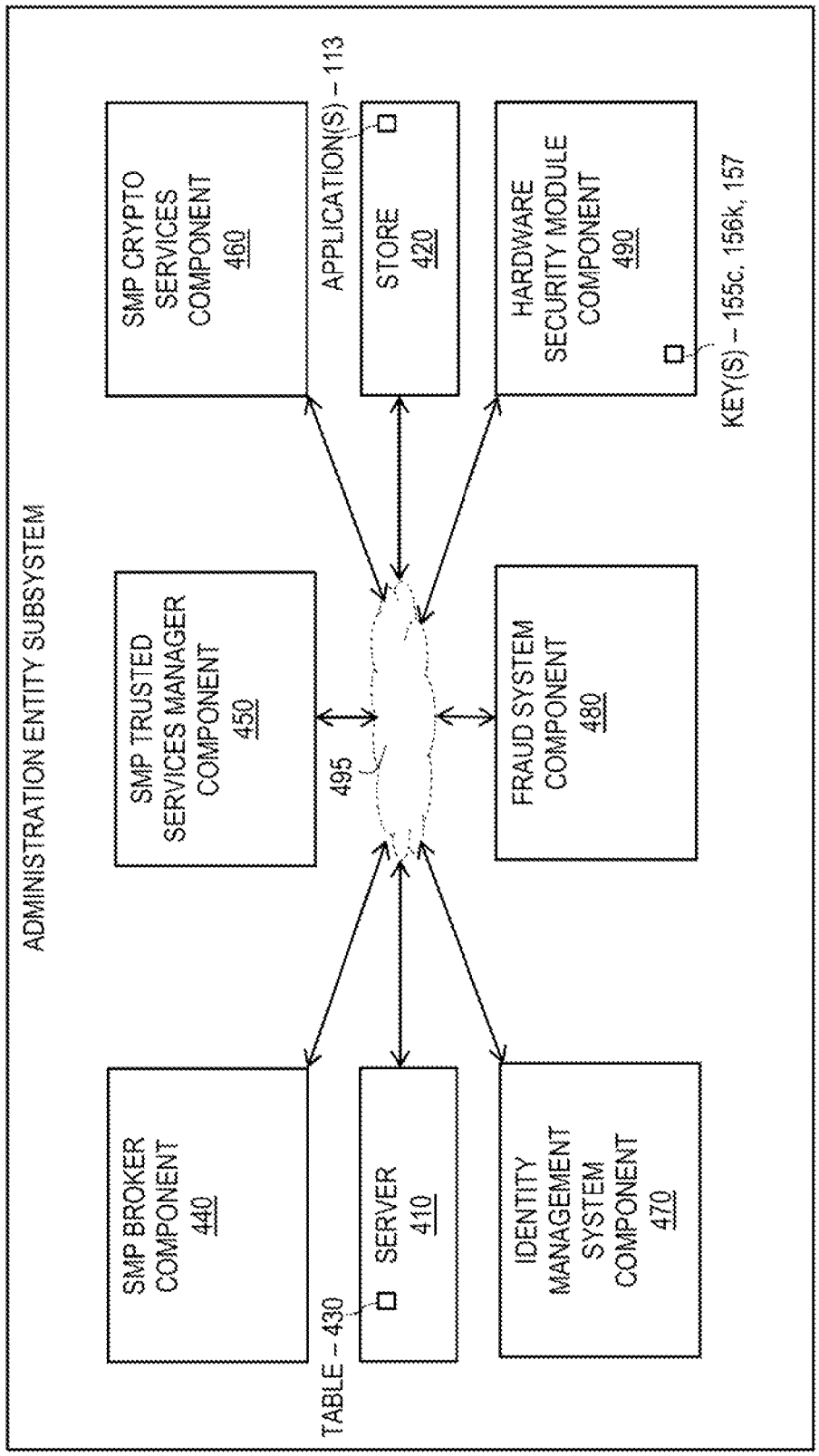
FIG. 4 is a more detailed schematic view of the example administration entity subsystem of the system of FIGS. 1 and 1A.
Figure 5:
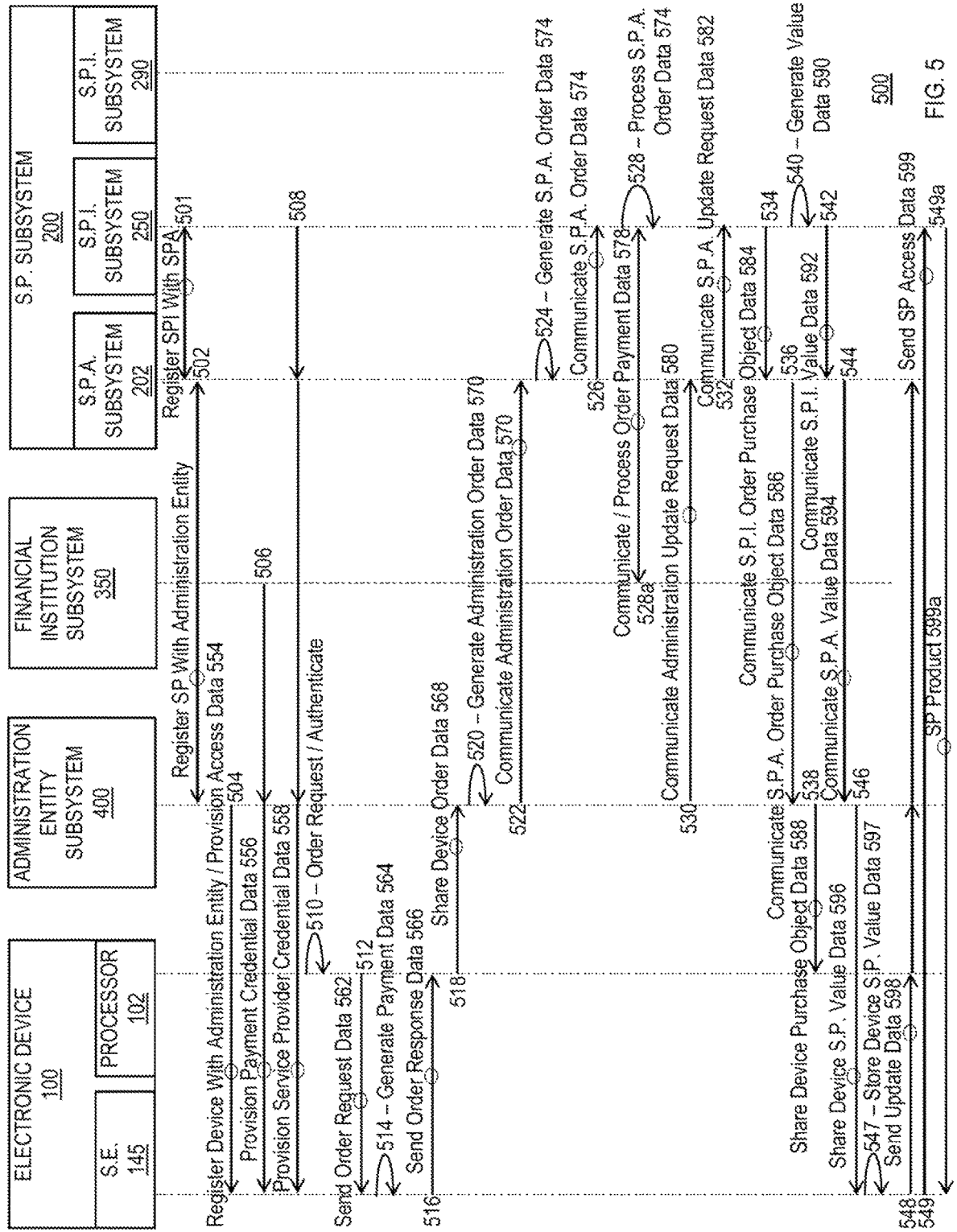
FIGS. 5 and 6 are flowcharts of illustrative processes for managing secure transactions.
Figure 6:
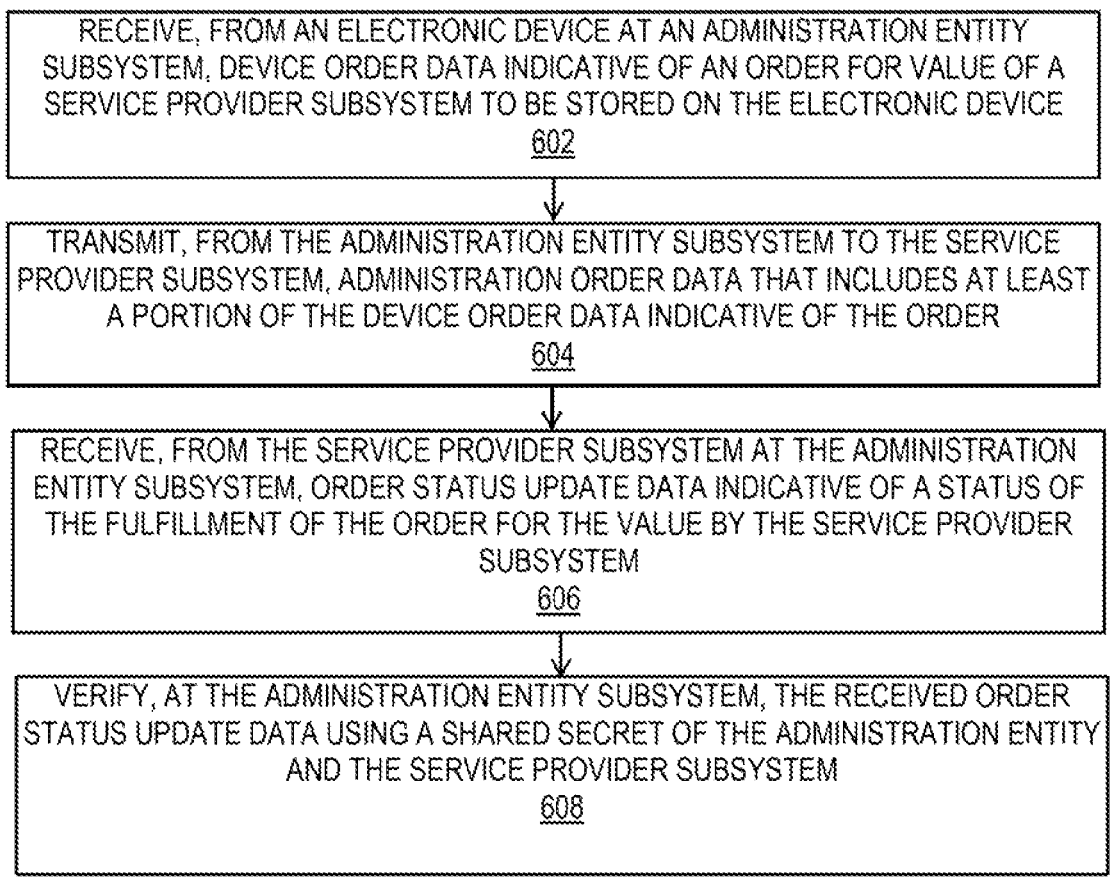

FIGS. 1 and 1A show a system 1 in which one or more transaction credentials (e.g., payment credentials and/or service credentials) provisioned on a secure element of an electronic device 100 may be shared with a service provider ("SP") subsystem 200 via an administration entity subsystem 400 that may manage a secure transaction between electronic device 100 and service provider subsystem 200, while FIGS. 2 and 3 show further details with respect to particular embodiments of electronic device 100 of system 1, FIGS. 3A-3E show example screens 190a-190e that may be representative of graphical user interfaces of electronic device 100 of system 1 during such a secure transaction, FIG. 4 shows further details with respect to particular embodiments of administration entity subsystem 400 of system 1, and FIGS. 5 and 6 are flowcharts of illustrative processes for managing secure transactions.

FIG. 1 is a schematic view of an illustrative system 1 that may allow for managing secure transactions between electronic device 100 and service provider subsystem 200 at an administrative entity subsystem 400. Electronic device 100 may generate device order (or purchase) data for use in a transaction with service provider subsystem 200 for funding a transfer of new service provider value from service provider subsystem 200 to electronic device 100 that may be later used by device 100 for accessing a particular service provider product (e.g., any suitable good or service) of the service provider subsystem (e.g., for enabling access to a particular service provider event or for enabling access to particular service provider data or physical goods) for the benefit of a user of electronic device 100. Such device order data may include any suitable transaction credential data that may be provided by or based on any suitable transaction or funding credential stored on a secure element of electronic device 100 and that may be operative to fund the transaction with service provider subsystem 200 (e.g., a service provider credential or a financial institution credential or any other suitable transaction credential that may be operative to provide or identify any suitable value source for funding the transaction). However, rather than communicating such device order data to service provider subsystem 200, electronic device 100 may communicate such device order data to administration (or commercial or authorizing) entity subsystem 400, which may be a trusted service manager of electronic device 100 and/or of service provider subsystem 200. For example, a device order may be generated using a funding credential on a secure element of device 100 and may fund the addition of new service provider value on that same secure element of device 100, while administration entity subsystem 400 may perform a central role in the entire transaction by acting as a conduit for all communications between service provider subsystem 200 and electronic device 100, which may enable administration entity subsystem 400 to securely communicate sensitive credential data amongst the subsystems by using one or more shared secrets available to administration entity subsystem 400 and one or more of the other subsystems/devices. In some embodiments, administration entity subsystem 400 may be the only subsystem in system 1 that may be operative to securely communicate credential data (e.g., cryptographically communicate service provider credential data and/or financial institution credential data) onto and/or from a secure element of device 100, such that administration entity subsystem 400 may act as a gatekeeper for all order transaction data communicated between a service provider subsystem and electronic device 100. Administration entity subsystem 400 may be operative to securely track the status of any orders and/or to manage the liability for funding a device order with service provider subsystem 200 and/or the liability for provisioning new service provider value on electronic device 100. Communication of any suitable data between electronic device 100 and administration entity subsystem 400 may be enabled via any suitable communications set-up 95, which may include any suitable wired communications path, wireless communications path, or combination of two or more wired and/or wireless communications paths using any suitable communications protocol(s) and/or any suitable network and/or cloud architecture(s). Additionally or alternatively, communication of any suitable data between service provider subsystem 200 and administration entity subsystem 400 may be enabled via any suitable communications set-up 95. Additionally or alternatively, communication of any suitable data between electronic device 100 and service provider subsystem 200 that may not be made via administration entity subsystem 400 may be enabled via any suitable communications set-up 95.

As shown in FIG. 1A, a more particular embodiment of system 1 may include electronic device 100 (e.g., a "host" or "source" electronic device), an electronic device 100' (e.g., a "client" or "target" or "recipient" electronic device), service provider ("SP") subsystem 200, a financial institution subsystem 350, and administration entity subsystem 400, where SP subsystem 200 may include a service provider authorization ("SPA") subsystem 202, a first service provider issuer ("SPI") subsystem 250, and a second SPI subsystem 290. Moreover, as shown in FIG. 1A, system 1 may include a communications path 15 for enabling communication between electronic device 100 and service provider subsystem 200 (e.g., first SPI subsystem 250), a communications path 25 for enabling communication between electronic device 100 and administration entity subsystem 400, a communications path 35 for enabling communication between administration entity subsystem 400 and service provider subsystem 200 (e.g., SPA subsystem 202), a communications path 45 for enabling communication between administration entity subsystem 400 and financial institution subsystem 350, a communications path 55 for enabling communication between service provider subsystem 200 (e.g., first SPI subsystem 250) and financial institution subsystem 350, a communications path 65 for enabling communication between electronic device 100' and administration entity subsystem 400, a communications path 75 for enabling communication between SPA subsystem 202 and first SPI subsystem 250 of SP subsystem 200, and a communications path 85 for enabling communication between SPA subsystem 202 and second SPI subsystem 290 of SP subsystem 200. One or more of paths 15, 25, 35, 45, 55, 65, 75, and 85 may be at least partially managed by one or more trusted service managers ("TSMs"). Any suitable circuitry, device, system, or combination of these (e.g., a wired and/or wireless communications infrastructure that may include one or more communications towers, telecommunications servers, or the like) that may be operative to create a communications network may be used to provide one or more of paths 15, 25, 35, 45, 55, 65, 75, and 85, which may be capable of providing communications using any suitable wired or wireless communications protocol. For example, one or more of paths 15, 25, 35, 45, 55, 65, 75, and 85 may support Wi-Fi (e.g., an 802.11 protocol), ZigBee (e.g., an 802.15.4 protocol), WiDi™, Ethernet, Bluetooth™, BLE, high frequency systems (e.g., 900 MHz, 2.4 GHz, and 5.6 GHz communication systems), infrared, TCP/IP, SCTP, DHCP, HTTP, BitTorrent™, FTP, RTP, RTSP, RTCP, RAOP, RDTP, UDP, SSH, WDS-bridging, any communications protocol that may be used by wireless and cellular telephones and personal e-mail devices (e.g., GSM, GSM plus EDGE, CDMA, OFDMA, HSPA, multi-band, etc.), any communications protocol that may be used by a low power Wireless Personal Area Network ("6LoWPAN") module, any other communications protocol, or any combination thereof. One or more of paths 15, 25, 35, 45, 55, 65, 75, and 85 may be enabled by any suitable communications set-up (e.g., communications set-up 95 of FIG. 1).

As shown in FIG. 1A and/or FIG. 2, for example, electronic device 100 may include a processor 102, memory 104, communications component 106, power supply 108, input component 110, output component 112, antenna 116, and near field communication ("NFC") component 120. Electronic device 100 may also include a bus 118 that may provide one or more wired or wireless communication links or paths for transferring data and/or power to, from, or between various other components of device 100. Electronic device 100 may also be provided with a housing 101 that may at least partially enclose one or more of the components of device 100 for protection from debris and other degrading forces external to device 100. In some embodiments, one or more components of electronic device 100 may be combined or omitted. Moreover, electronic device 100 may include other components not shown in FIG. 1A and/or FIG. 2. For example, electronic device 100 may include any other suitable components or several instances of the components (e.g., antennas) shown in FIG. 1A and/or FIG. 2. For the sake of simplicity, only one of each of the components is shown in FIG. 2. One or more input components 110 may be provided to permit a user to interact or interface with device 100 and/or one or more output components 112 may be provided to present information (e.g., graphical, audible, and/or tactile information) to a user of device 100. It should be noted that one or more input components and one or more output components may sometimes be referred to collectively herein as an input/output ("I/O") component or I/O interface 114 (e.g., input component 110 and output component 112 as I/O component or I/O interface 114). For example, input component 110 and output component 112 may sometimes be a single I/O component 114, such as a touch screen, that may receive input information through a touch of a display screen and that may also output visual information via that same display screen. Processor 102 of electronic device 100 may include any processing circuitry that may be operative to control the operations and performance of one or more components of electronic device 100. For example, processor 102 may receive input signals from input component 110 and/or drive output signals through output component 112. As shown in FIG. 2, processor 102 may be used to run one or more applications, such as an application 103 and/or an application 113. As one example, application 103 may be an operating system application while application 113 may be a third party application or any other suitable online resource (e.g., an application associated with a service provider of service provider subsystem 200). Moreover, processor 102 may have access to device identification information 119, which may be utilized to provide identification of device 100.

NFC component 120 may include or otherwise provide a secure element 145 that may be configured to provide a tamper-resistant platform (e.g., as a single-chip or multiple-chip secure microcontroller) that may be capable of securely hosting applications and their confidential and cryptographic data in accordance with rules and security requirements that may be set forth by a set of well-identified trusted authorities (e.g., an authority of SP subsystem 200 and/or of administration entity subsystem 400 and/or of financial institution subsystem 350 and/or of an industry standard, such as GlobalPlatform). Any suitable transaction credential information, such as service provider credential information and/or financial institution credential information, may be stored in an applet on secure element 145 (e.g., of NFC component 120) of device 100 and may be configured to provide transaction credential data for use in any suitable device order data of a transaction with a remote entity subsystem, such as service provider subsystem 200 and/or financial institution subsystem 350 (e.g., a banking institution). For example, the transaction credential data may provide an actual value source and/or may provide sufficient detail for identifying an account associated with a remote entity subsystem that may be used to as a value source, and the value source may be used to at least partially fund a transaction between electronic device 100 and service provider subsystem 200 for any suitable service provider service (e.g., any suitable good or service that may be provided on behalf of service provider subsystem 200 for the benefit of a user of electronic device 100).

NFC component 120 may be configured to communicate certain transaction credential data as a contactless proximity-based communication 5 (e.g., near field communication) with service provider subsystem 200 (e.g., with an SPI terminal 220 of SP subsystem 200 (e.g., of SPI subsystem 250), which may be located at a brick and mortar store or any physical location at which a user of device 100 may use one or more transaction credentials stored on device 100 to conduct a transaction with a proximately located service provider terminal 220 via a contactless proximity-based communication). Alternatively, or additionally, communications component 106 may be provided to allow device 100 to communicate any suitable transaction credential data (e.g., as an online-based communication) with one or more other electronic devices or servers or subsystems (e.g., one or more subsystems or other components of system 1, such as with SPI server 210 of SP subsystem 200 (e.g., of SPI subsystem 250) via any suitable online communication) using any suitable wired or wireless protocol (e.g., via one or more of communications paths 15, 25, and 35). Processor 102 of device 100 may include any processing circuitry that may be operative to control the operations and performance of one or more components of device 100. For example, processor 102 may be configured to run one or more applications on device 100 (e.g., a device or administration entity application 103 and/or an online resource or service provider or financial institution application 113) that may at least partially dictate the way in which data (e.g., transaction credential data of any suitable device order data) may be communicated by device 100 for funding or otherwise carrying out a transaction with service provider subsystem 200. Moreover, device 100 may include any suitable device identification information or device identifier (e.g., device identifier information 119 of FIG. 2), which may be accessible to processor 102 or any other suitable portion of device 100. Any suitable device identification information may be utilized by any suitable subsystem of system 1, such as administration entity subsystem 400 and/or service provider subsystem 200, for uniquely identifying device 100 to facilitate a transaction with service provider subsystem 200 and/or to enable any suitable secure communication with device 100. As just one example, device identification information may be a telephone number or e-mail address or any unique identifier that may be associated with device 100.

NFC component 120 may be any suitable proximity-based communication mechanism that may enable contactless proximity-based transactions or communications between electronic device 100 and a service provider terminal (e.g., service provider payment terminal 220) of service provider subsystem 200. NFC component 120 may include any suitable modules for enabling contactless proximity-based communication between electronic device 100 and such a service provider terminal. As shown in FIG. 2, for example, NFC component 120 may include an NFC device module 130, an NFC controller module 140, and/or an NFC memory module 150. NFC device module 130 may include an NFC data module 132, an NFC antenna 134, and an NFC booster 136. NFC data module 132 may be configured to contain, route, or otherwise provide any suitable data that may be transmitted by NFC component 120 to a service provider terminal as part of a contactless proximity-based or NFC communication. Additionally, or alternatively, NFC data module 132 may be configured to contain, route, or otherwise receive any suitable data that may be received by NFC component 120 from a service provider terminal as part of a contactless proximity-based communication. NFC controller module 140 may include at least one NFC processor module 142. NFC processor module 142 may operate in conjunction with NFC device module 130 to enable, activate, allow, and/or otherwise control NFC component 120 for communicating an NFC communication between electronic device 100 and a service provider terminal. NFC controller module 140 may include at least one NFC processor module 142 that may be used to run one or more applications, such as an NFC low power mode or wallet application 143 that may help dictate the function of NFC component 120. NFC memory module 150 may operate in conjunction with NFC device module 130 and/or NFC controller module 140 to allow for NFC communications between electronic device 100 and service provider subsystem 200. NFC memory module 150 may be tamper resistant and may provide at least a portion of a secure element 145. For example, such a secure element may be configured to provide a tamper-resistant platform (e.g., as a single-chip or multiple-chip secure microcontroller) that may be capable of securely hosting applications and their confidential and cryptographic data (e.g., applets 153 and keys 155) in accordance with rules and security requirements that may be set forth by a set of well-identified trusted authorities (e.g., an authority of financial institution subsystem and/or an industry standard, such as GlobalPlatform).

As shown in FIG. 2, for example, NFC memory module 150 may include one or more of an issuer security domain ("ISD") 152 and a supplemental security domain ("SSD") 154 (e.g., a service provider security domain ("SPSD"), a trusted service manager security domain ("TSMSD"), etc.), which may be defined and managed by an NFC specification standard (e.g., GlobalPlatform). For example, ISD 152 may be a portion of NFC memory module 150 in which a trusted service manager ("TSM") or issuing remote subsystem (e.g., service provider subsystem 200 and/or financial institution subsystem 350 and/or administration entity subsystem 400) may store keys and/or other suitable information for creating or otherwise provisioning one or more credentials (e.g., credentials associated with various credit cards, bank cards, gift cards, store value cards, reloadable cards, access cards, transit passes, service provider product access passes or value, digital currency (e.g., bitcoin and associated payment networks), etc.) on electronic device 100 (e.g., via communications component 106), for credential content management, and/or for security domain management. A credential may include credential data (e.g., credential information) that may be assigned to a user/consumer/device and that may be stored securely on electronic device 100, such as a credit card payment number (e.g., a device primary account number ("DPAN"), DPAN expiry date, CVV, etc. (e.g., as a token or otherwise)). As shown, NFC memory module 150 may include at least three SSDs 154 (e.g., at least a first SSD 154*a*, a second SSD 154*b*, and a third SSD 154*c*). For example, first SSD 154*a* (e.g., a service provider credential SSD 154*a*) may be associated with a specific service provider credential (e.g., a specific type of value source credential that may be provisioned by service provider subsystem 200) that may provide specific privileges or access rights to electronic device 100, while a second SSD 154*b* (e.g., a financial institution credential SSD 154*b*) may be associated with a specific financial institution credential (e.g., a specific credit card credential or other suitable payment credential provisioned by financial institution subsystem 350) that may provide specific privileges or payment rights to electronic device 100, while third SSD 154*c* (e.g., an administration SSD 154*c*) may be associated with an administration entity (e.g., an administration entity of administration entity subsystem 400, which may be a controlling entity for device 100) that may control access of device 100 to a specific credential of another SSD (e.g., first SSD 154*a* and/or second SSD 154*b*), for example, to provide specific privileges or payment rights to electronic device 100. Different SSDs may be provided on different secure elements or the same secure element. For example, SSD 154*a* may be provided on a first secure element of device 100 and SSD 154*b* may be provided on a second secure element of device 100 that may be different than the first secure element. An SSD 154 may include and/or be associated with at least one applet 153 (e.g., SSD 154*a* with applet 153*a*, SSD 154*b* with applet 153*b*, and SSD 154*c* with applet 153*c*). For example, an applet 153 of an SSD 154 may be an application that may run on a secure element of NFC component 120 (e.g., in a GlobalPlatform environment). A credential applet 153 may include or be associated with credential information (e.g., credential information of SSD 154*a* and/or of SSD 154*b* may be operative to provide transaction credential data for funding a transaction between device 100 and service provider subsystem 200). Each SSD 154 and/or applet 153 may also include and/or be associated with at least one keys 155 (e.g., applet 153*a* with at least one key 155*a*, applet 153*b* with at least one key 155*b*, and applet 153*c* with at least one key 155*c*).

A key 155 of an SSD 154 may be a piece of information that can determine a functional output of a cryptographic algorithm or cipher. For example, in encryption, a key may specify a particular transformation of plaintext into ciphertext, or vice versa during decryption. Keys may also be used in other cryptographic algorithms, such as digital signature schemes and message authentication codes. A key of an SSD may provide any suitable shared secret with another entity (e.g., key 155*a* of service provider credential SSD 154*a* may also be accessible to service provider subsystem 200 (e.g., key 155*a* of service provider credential SSD 154*a* may be the same as or associated with SPI key 155*a* of SP subsystem 200 (e.g., they may be a public/private key pair) to enable secure communication of credential data of SSD 154*a* between SSD 154*a* and SP subsystem 200), key 155*b* of financial institution credential SSD 154*b* may also be accessible to financial institution subsystem 350 (e.g., key 155*b* of financial institution credential SSD 154*b* may be the same as or associated with key 155*b* of financial institution subsystem 350 (e.g., they may be a public/private key pair) to enable secure communication of credential data of SSD 154*b* between SSD 154*b* and financial institution subsystem 350), and/or key 155*c* of administration credential SSD 154*c* may also be accessible to administration entity subsystem 400 (e.g., key 155*c* of administration credential SSD 154*c* may be the same as or associated with administration key 155*c* of administration entity subsystem 400 (e.g., they may be a public/private key pair) to enable secure communication of credential data of SSD 154*c* between SSD 154*c* and administration entity subsystem 400). Such a shared secret between an SSD of secure element 145 of device 100 and a remote subsystem may be any suitable shared secret (e.g., a password, passphrase, array of randomly chosen bytes, one or more symmetric keys, public-private keys (e.g., asymmetric keys), etc.) to both the secure element of electronic device 100 and the remote subsystem that may be operative to enable any suitable crypto data (e.g., a cryptogram) or any other suitable data to be independently generated by electronic device 100 and the remote subsystem (e.g., for validating funding data for a transaction), such as by using any suitable cryptographic algorithm or cipher whose functional output may be at least partially determined by the shared secret, where such a shared secret may be provisioned on device 100 by the remote subsystem. A shared secret may either be shared beforehand between the remote subsystem and device 100 (e.g., during provisioning of a credential on device 100 by the remote subsystem), in which case such a shared secret may be referred to as a pre-shared key, or a shared secret may be created prior to use for a particular financial transaction by using a key-agreement protocol (e.g., using public-key cryptography, such as Diffie-Hellman, or using symmetric-key cryptography, such as Kerberos). The shared secret and any suitable cryptographic algorithm or cipher whose functional output may be at least partially determined by the shared secret may be accessible to the secure element of device 100. Each key and applet may be loaded on the secure element of device 100 by a TSM or an authorized agent or pre-loaded on the secure element when first provided on device 100. As one example, while credential SSD 154b may be associated with a particular credit card credential, that particular credential may only be communicated as transaction credential data from a secure element of device 100 (e.g., from NFC component 120) for a transaction when applet 153b of that credential SSD 154b has been enabled or otherwise activated or unlocked for such use.

Security features may be provided for enabling use of NFC component 120 that may be particularly useful when transmitting confidential credential information, such as credit card information or bank account information of a credential, from electronic device 100. Such security features also may include a secure storage area that may have restricted access. For example, user authentication via personal identification number ("PIN") entry or via user interaction with a biometric sensor may need to be provided to access the secure storage area. As an example, administration SSD 154c may leverage applet 153c to determine whether such authentication has occurred before allowing other SSDs 154 (e.g., credential SSD 154a or credential SSD 154b) to be used for communicating its credential information. In certain embodiments, some or all of the security features may be stored within NFC memory module 150. In certain embodiments, NFC memory module 150 may include a microcontroller embedded within electronic device 100. As just one example, applet 153c of administration SSD 154c may be configured to determine intent and local authentication of a user of device 100 (e.g., via one or more input components 110, such as a biometric input component) and, in response to such a determination, may be configured to enable another particular SSD for conducting a transaction (e.g., with a credential of a credential SSD 154a).

Service provider subsystem 200 may include SPA subsystem 202 and at least one SPI subsystem, such as first service provider issuer ("SPI") subsystem 250 and second SPI subsystem 290. Each one of the SPI subsystems of SP subsystem 200 may be a merchant or other suitable type of service provider (e.g., transportation provider, event provider, hospitality provider, goods seller, etc.) that may be operative to provide any suitable service or good for the benefit of a user of device 100. For example, in some embodiments, an SPI subsystem may be controlled by or operated on behalf of a SP entity that may control access to any suitable SP product (e.g., goods or services or locations or other suitable constructs) that may be of value to a user of device 100, and the SPI subsystem may be operative to generate any suitable service provider value ("SPV") data that may be shared with a recipient electronic device (e.g., ordering host electronic device 100 or any suitable recipient device (e.g., client device 100') that may be identified by ordering host electronic device 100), where such SPV data may be stored on the recipient device (e.g., as an item of actual value) for later use by the recipient device to gain certain access to the SP product. For example, SPV data may be an actual monetary value that may be stored on a recipient device (e.g., in secure element 145 of device 100) and decremented by a particular monetary value when used by the recipient device to gain access to an SP product of that value (e.g., SPV data may be $80 to be stored on a stored value card on a recipient device and then decremented by a certain amount when the recipient device uses credential data of the stored value card to gain access to SP product (e.g., $12.37 to pay for a ride of that value as provided by a ride providing service provider or $2 to gain access to a single ride on a transit system service provider or $5 to gain access to a transit system of a service provider for 5 consecutive hours)). As another example, SPV data may be valued by its ability to grant SP product access of a certain type, where the SPV data may be stored on a recipient device (e.g., in secure element 145 of device 100) and decremented by any suitable unit or completely removed when used by the recipient device to gain access to an SP product (e.g., SPV data may be indicative of 10 single admission passes to an SP product that can be stored on a stored value card on a recipient device and then decremented by a certain amount when the recipient device uses credential data of the stored value card to gain access to SP product (e.g., 2 passes to gain access for two people to a zoo)).

SPV data may be stored on a recipient device and adjusted in any suitable manner when utilized by the recipient device to generate SP access data (e.g., contactless proximity-based communication 5) for receipt by SP subsystem 200 (e.g., terminal 220) in order to grant any suitable SP product access to the recipient device and/or its owner and/or its owner's associates (e.g., admission to a particular entertainment event or transportation event or media data (e.g., for download to the recipient device) or the like), where the SPV data may be provisioned on the recipient device for use as proof of a receipt of purchase of particular SP product access that may be redeemed for the SP product access through communication of the SPV data with SP subsystem 200 (e.g., a receipt that may be presented by a user of the recipient device to pick up a physical good of a service provider). Therefore, SPV data may be any suitable data that may be stored on a recipient device (e.g., device 100 and/or device 100') to define at least a portion of service provider credential data (e.g., of service provider applet 153a of service provider SSD 154a on secure element 145 or as service provider credential data 123 that may be stored in memory 104 of device 100 and not in a secure element), which may then be provided by the recipient device as at least a portion of SP access data to a service provider for gaining access to an SP product. Specific service provider credential data provisioned on a recipient device may be associated with a specific SP credential that may be electronically linked to an account or accounts of a particular user with SP subsystem 200 (e.g., accounts for various types of stored-value cards (e.g., transit cards or e-Money cards), gift cards, loyalty cards, rewards cards/accounts, points cards/accounts, advantage cards/accounts, club cards/accounts, member cards/accounts, disloyalty cards/accounts, gift cards/accounts, stamp cards/accounts, class cards/accounts, private label account cards/accounts, reloadable prepaid account cards/accounts, non-reloadable prepaid account cards/accounts, punch cards/accounts, stored value cards/accounts, digital representations of the same, and the like, and the like). Such SP credential data may be provisioned on device 100 (e.g., as an SP credential of an SP credential supplemental security domain of NFC component 120 or as data 123 of memory 104) by SP subsystem 200 (e.g., via administration entity subsystem 400) and may later be used by device 100 as at least a portion of device order data for funding a transaction with service provider subsystem 200 (e.g., to pay for a good or service or for other service provider credential data (e.g., new SPY data)). For example, SPI subsystem 250 may generate SPY data for provisioning on device 100 (e.g., from server 210 via SP subsystem 202 and administration entity subsystem 400 to device 100) and then that SPY data may be used by device 100 to generate SP access data that may be communicated to SPI subsystem 250 for gaining access to a particular SP product (e.g., device 100 may communicate SPV data as a portion of SP access data as a contactless proximity-based communication 5 to terminal 220 of SPI subsystem 250, where terminal 220 may be provided at a gated turnstile of a transit system that may grant a user of device 100 particular access to that transit system in response to receiving particular SP access data with particular SPY data from device 100, or device 100 may communicate SPY data as a portion of SP access data as an online communication via communications path 15 to server 210 of SPI subsystem 250, where server 210 may manage an SP website or portal that may grant a user of device 100 particular access to particular data in response to receiving particular SP access data with particular SPV data from device 100 (e.g., special content of the website that may only be accessible to user devices that are able to present particular SPV data (e.g., to prove a monthly subscription to that SP website))). In some embodiments, the SPI subsystem that may generate the SPY data may be a ticketing or other suitable partner subsystem of another SP subsystem of SP subsystem 200 that may actually provide the SP product (e.g., a first SPI subsystem may generate SPY data for provisioning on a recipient device, while the recipient device may then use that SPY data to gain access to SP product of a second SPI subsystem). A specific service provider credential applet of NFC component 120 of device 100 and/or a specific service provider credential data structure (e.g., data 123) of memory component 104 of device 100 may be associated with a specific service provider credential that may be defined by SPY data generated by and communicated from SP subsystem 200 (e.g., from a specific SPI subsystem) that may be generic for all users (e.g., an anonymous SP credential that may provide SP product access to any particular person that may use device 100 (e.g., access to a sporting event product)) and/or that may be personalized for a specific user and electronically linked to an account or accounts of a particular user with service provider subsystem 200 (e.g., a personalized SP credential that may be registered to a particular user for specific SP product access (e.g., access to a specific transportation itinerary product)). Certain SPV data may be presented by the recipient device (e.g., on a display output component) as a particular code or redeemable data structure (e.g., QR code) that may be scanned or otherwise detected by the SP subsystem for authenticating the SP value stored on and/or being presented by the recipient device.

Also known as a technology provider or a service enabler or bridge, SPA subsystem 202 may be operated by and/or as a partner of one or more SPI subsystems (e.g., SPI subsystem 250 and/or SPI subsystem 290) and may be configured to work with administration entity subsystem 400 to communicate device order data provided from device 100 to an appropriate SPI subsystem, such that administration entity subsystem 400 need not communicate directly with (or even be aware of) each SPI subsystem and such that each SPI subsystem need not communicate directly with administration entity subsystem 400. While in some embodiments, SPA subsystem 202 and an SPI subsystem (e.g., SPI subsystem 250) may be a single entity (e.g., a single subsystem operated by a single controlling entity), SPA subsystem 202 and an SPI subsystem may be separate entities (e.g., different subsystems operated by different controlling entities). For example, FeliCa Networks may be a controlling entity of SPA subsystem 202 while East Japan Railway Company ("JRE") may be a controlling entity of SPI subsystem 250 and while another railway company may be a controlling entity of SPI subsystem 290. By interfacing between administration entity subsystem 400 and first SPI subsystem 250 (and/or second SPI subsystem 290), SPA subsystem 202 may reduce the number of entities that administration entity subsystem 400 and each SPI subsystem may have to interact with directly. That is, to minimize direct integration points of service provider subsystem 200, SPA subsystem 202 may act as an aggregator for various SPI subsystems and/or various administration entity subsystems. While SPA subsystem 202 may be shown in FIG. 1A to include an SPA server 204 and access to one or more SPA keys 157 and/or at least one SPA identifier 167 that may be unique to SPA subsystem 202, one, some, or all components of SPA subsystem 202 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100. While first SPI subsystem 250 may be shown in FIG. 1A to include an SPI server 210, an SPI bus 218, an SPI terminal 220, and access to one or more SPI keys 155*a* and/or at least one SPI identifier 267 that may be unique to first SPI subsystem 250, one, some, or all components of first SPI subsystem 250 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100. Similarly, second SPI subsystem 290 may include an SPI server, an SPI bus, an SPI terminal, and access to one or more SPI keys and/or at least one SPI identifier that may be unique to second SPI subsystem 290, one, some, or all components of second SPI subsystem 290 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100. In the case of SPA subsystem 202 and first SPI subsystem 250 being separate subsystems, data may be communicated therebetween using any suitable communications path 75. Additionally or alternatively, in the case of SPA subsystem 202 and second SPI subsystem 290 being separate subsystems, data may be communicated therebetween using any suitable communications path 85.

Although not shown, financial institution subsystem 350 may include a payment network subsystem (e.g., a payment card association or a credit card association) and/or an issuing bank subsystem. One or more specific financial institution or payment credential applets of NFC component 120 of device 100 (e.g., financial institution applet 153b of financial institution SSD 154b of secure element 145) may be associated with a specific payment credential that may be electronically linked to an account or accounts of a particular user with financial institution subsystem 350 (e.g., accounts for various types of payment cards may include credit cards, debit cards, charge cards, stored-value cards (e.g., transit cards), fleet cards, gift cards, and the like). Such a payment credential may be provisioned on device 100 (e.g., as financial institution credential information of applet 153b of SSD 154b) by financial institution subsystem 350 (e.g., via administration entity subsystem 400) and may later be used by device 100 as at least a portion of device order data for funding a transaction with service provider subsystem 200 (e.g., to pay for a good or service or service provider credential data (e.g., SPV data)).

For certain transactions to occur within system 1, at least one transaction credential (e.g., a service provider credential and/or a financial institution credential) may be provisioned on device 100 (e.g., on secure element 145 of electronic device 100 (e.g., as credential information of an applet 153) and/or on any other suitable memory portion (e.g., memory component 104 (e.g., as service provider credential data 123))). For example, such a credential may be at least partially provisioned in memory 104 of device 100 as service provider credential data 123 directly from service provider subsystem 200 (e.g., via communications path 15 or as a communication 5 between service provider subsystem 200 and device 100) or on secure element 145 as SP credential information of SP applet 153a (e.g., via administration entity subsystem 400). Any suitable credential data may be provisioned on secure element 145 of device 100 as at least a portion or all of a credential supplemental security domain of the secure element and may include a credential applet with credential information and/or a credential key, such as credential application or credential applet 153a with credential information and credential key 155a. Such a transaction credential may then be used to define at least a portion of device transaction data that may be operative to fund a transaction for an SP product (e.g., access to a particular good or service of a service provider or new SPV data for defining new SP credential information on an SP applet 153a).

Administration entity subsystem 400 may be provided as an intermediary between device 100 and service provider subsystem 200 and/or any other remote subsystem (e.g., financial institution subsystem 350), where administration entity subsystem 400 may be configured to provide a new layer of security and/or to provide a more seamless user experience when a credential is being provisioned on device 100 and/or when such a provisioned credential is being used as part of a credential data communication between device 100 and service provider subsystem 200. Administration entity subsystem 400 may be provided by a specific administration entity that may offer various services to a user of device 100 via user-specific log-in information to a user-specific account with that administration entity (e.g., via user-specific identification and password combinations). As just one example, administration entity subsystem 400 may be provided by Apple Inc. of Cupertino, Calif., which may also be a provider of various services to users of device 100 (e.g., the iTunes™ Store for selling/renting media to be played by device 100, the Apple App Store™ for selling/renting applications for use on device 100, the Apple iCloud™ Service for storing data from device 100 and/or associating multiple user devices and/or multiple user profiles with one another, the Apple Online Store for buying various Apple products online, the Apple iMessage™ Service for communicating media messages between devices, etc.), and which may also be a provider, manufacturer, and/or developer of device 100 itself (e.g., when device 100 is an iPod™, iPad™, iPhone™, or the like) and/or of an operating system (e.g., device application 103) of device 100. The administration entity that may provide administration entity subsystem 400 (e.g., Apple Inc.) may be distinct and independent from any financial entity of any remote financial institution subsystem 350. For example, the administration entity that may provide administration entity subsystem 400 may be distinct and/or independent from any payment network or issuing bank that may furnish and/or manage any credit card or any other payment credential to be provisioned on end-user device 100 by financial entity subsystem 350. Additionally, or alternatively, the administration entity that may provide administration entity subsystem 400 (e.g., Apple Inc.) may be distinct and independent from any service provider of service provider subsystem 200 that may furnish and/or manage any SP credential data to be provisioned on end-user device 100. For example, the administration entity that may provide administration entity subsystem 400 may be distinct and/or independent from any service provider of service provider subsystem 200 (e.g., of SPA subsystem 202, of SPI subsystem 250, and/or of SPI subsystem 290) that may provide a service provider terminal for contactless proximity-based communications, a service provider server and/or a third party application or online resource 113 for online communications, and/or any other aspect of service provider subsystem 200. Such an administration entity may leverage its potential ability to configure or control various components of device 100 (e.g., software and/or hardware components of device 100, such as when that administration entity may at least partially produce or manage device 100) in order to provide a more seamless user experience for a user of device 100 when he or she wants to provision a credential offered by service provider subsystem 200 or any other remote subsystem on device 100 and/or when such a provisioned credential is being used as part of a credential data communication with service provider subsystem 200 to carry out a transaction. For example, in some embodiments, device 100 may be configured to communicate with administration entity subsystem 400 seamlessly and transparently to a user of device 100 (e.g., via communications path 25) for sharing and/or receiving certain data that may enable a higher level of security (e.g., during provisioning of credential data on device 100 and/or during an online-based secure data communication between device 100 and service provider subsystem 200). Although not shown, administration entity subsystem 400 may also include a processor component that may be the same as or similar to processor component 102 of electronic device 100 of FIGS. 1A and 2, a communications component that may be the same as or similar to communications component 106 of electronic device 100 of FIGS. 1A and 2, an I/O interface that may be the same as or similar to I/O interface 114 of electronic device 100 of FIG. 2, a bus that may be the same as or similar to bus 118 of electronic device 100 of FIGS. 1A and 2, a memory component that may be the same as or similar to memory component 104 of electronic device 100 of FIG. 2, and/or a power supply component that may be the same as or similar to power supply component 108 of electronic device 100 of FIG. 2, one, some or all of which may be at least partially provided by server 410.

As mentioned, administration SSD 154c with an administration key 155c may also be provisioned on secure element 145 or memory component 104 of device 100 in order to more securely enable device 100 to conduct a transaction with service provider subsystem 200. Administration entity subsystem 400 may also have access to an administration key 155c (e.g., for decrypting data encrypted by device 100 using administration key 155c). Administration entity subsystem 400 may be responsible for management of keys 155c, which may include the generation, exchange, storage, use, and replacement of such a key. Administration entity subsystem 400 may store its version of key 155c in a secure element of administration entity subsystem 400. Administration SSD 154c of device 100 with key 155c may be configured to determine intent and local authentication of a user of device 100 (e.g., via one or more input components 110 of device 100, such as a biometric input component) and, in response to such a determination, may be configured to enable another particular SSD for conducting a transaction (e.g., with a service provider credential and/or a financial institution credential of a credential SSD of device 100). By storing such an administration SSD on device 100, its ability to reliably determine user intent for and authentication of a transaction may be increased. Moreover, access data provided by key 155c of such an administration SSD of device 100 may be leveraged to provide increased encryption to transaction data that may be communicated outside of the secure element of device 100 or outside of device 100 itself. Additionally, or alternatively, such access data may include an issuer security domain ("ISD") key 156k for an ISD 152 of electronic device 100, which may also be maintained by administration entity subsystem 400, and may be used in addition to or as an alternative to key 155c.

A service provider application or online resource 113 may be accessed by device 100 in order to enable an online transaction (e.g., data transaction, commercial transaction, purchase transaction, financial transaction, etc.) to be facilitated between device 100 and service provider subsystem 200 or to enable online access to any other suitable secure device functionality of device 100 by service provider subsystem 200. First, such an application 113 may be approved or registered or otherwise enabled by administration entity subsystem 400 before application 113 may be effectively utilized by device 100. For example, an application store 420 of administration entity subsystem 400 (e.g., the Apple App Store™) may receive at least some data representative of application 113 from service provider subsystem 200 via communications path 35. Moreover, in some embodiments, administration entity subsystem 400 may generate or otherwise assign a service provider key (e.g., SPA key 157) for SPA subsystem 200 (e.g., for application 113 or subsystem 202 generally) and may provide such a service provider key 157 to service provider subsystem 200 (e.g., via path 35). Alternatively, service provider subsystem 200 may generate or otherwise assign a service provider key 157 for SPA subsystem 200 (e.g., for application 113 or subsystem 202 generally) and may provide such a service provider key 157 to administration entity subsystem 400 (e.g., via path 35). Either service provider subsystem 200 or administration entity subsystem 400 may be responsible for management of service provider key 157, which may include the generation, exchange, storage, use, and replacement of such a key. No matter how or where such a service provider key 157 may be generated and/or managed, both service provider subsystem 200 and administration entity subsystem 400 may store a version of service provider key 157 (e.g., in a respective secure element of service provider subsystem 200 and administration entity subsystem 400, where, in some embodiments, the service provider key 157 stored by service provider subsystem 200 may be a private key and the service provider key 157 stored by administration entity subsystem 400 may be a corresponding public key (e.g., for use in asymmetric key encryption/decryption processes)). In some embodiments, such a service provider key 157 may be specifically associated with a service provider application 113 and/or with a service provider credential, while, in other embodiments, service provider key 157 may be specifically associated with a service provider of service provider subsystem 200 (e.g., SPA subsystem 202) such that service provider key 157 may be associated with multiple third party applications or web resources or credentials of the same service provider of service provider subsystem 200 (e.g., with multiple SPI subsystems). A unique service provider identifier 167 may be generated and/or otherwise assigned to or associated with an application 113 and/or one or more service provider credentials and/or SP subsystems by administration entity subsystem 400 and/or by service provider subsystem 200. For example, a service provider (or merchant) identifier 167 may be an alphanumeric string, a domain (e.g., a URL or otherwise for a web resource type online resource application 113), or any other suitable identifier that may uniquely identify a service provider (e.g., SPA subsystem 202) and/or a particular service provider online resource and/or a particular service provider credential (e.g., uniquely identify such to administration entity subsystem 400). A table 430 or any other suitable data structure or source of information that may be accessible to administration entity subsystem 400 may be provided for associating a particular service provider key 157 with a particular service provider identifier 167 of a service provider application 113 or service provider credential or service provider entity (e.g., SPA subsystem 202). A service provider online resource may be associated with a particular service provider identifier 167 and a particular service provider key 157, each of which may be securely shared between service provider subsystem 200 and administration entity subsystem 400. Table 430 may enable administration entity subsystem 400 to determine and utilize an appropriate service provider key 157 for providing a layer of security to any secure device data communicated to service provider subsystem 200 (e.g., credential data that may include financial institution payment credential data and/or SP credential data native to device 100) for a transaction that may involve device 100 interfacing with service provider subsystem 200 via service provider application 113 or device application 103 or otherwise that may be associated with key 157 and service provider identifier 167. Device 100 may be configured to access application 113 (e.g., from application store 420 via communications path 25) and run application 113 (e.g., with processor 102). Alternatively, or additionally, a service provider key 157 and service provider identifier 167 may be associated with a service provider's website (e.g., one or more URLs or domains, which may be referred to herein as a service provider online resource or service provider application in some embodiments) or with the service provider generally, rather than or in addition to a service provider's third party native app. For example, a service provider of service provider subsystem 200 may work with administration entity subsystem 400 to associate a particular service provider website or the service provider generally with a particular service provider key 157 and service provider identifier 167 within table 430, which may enable administration entity subsystem 400 to determine and utilize an appropriate service provider key 157 for providing a layer of security to any secure device data communicated to service provider subsystem 200 (e.g., credential data that may include credential data native to device 100) for a transaction that may involve device 100 interfacing with service provider server 210 to conduct a transaction via an internet application or web browser running on device 100 that may be pointed to a URL or domain whose target or web resource may be associated with that service provider key 157 and service provider identifier 167 (e.g., the unique domain of that web resource (e.g., store.program.provider.com)). Device 100 may be configured to access such a URL, for example, from service provider server 210 via communication path 15 (e.g., using an internet application 113 on device 100 that may be considered a service provider online resource when targeting such a service provider web resource). In other embodiments, an application 113 may not be associated with a specific service provider, service provider subsystem 200, service provider key 157, and/or service provider identifier 167, but instead may be an independent application available to device 100 with a webview targeting such a service provider web resource, thereby acting as a service provider online resource. Such a registration of a service provider online resource by administration entity subsystem 400 (e.g., secure and validated sharing of service provider key 157 and service provider identifier 167 between service provider subsystem 200 and administration entity subsystem 400 (e.g., for storage in table 430)) may be carried out in any suitable manner to ensure administration entity subsystem 400 that service provider subsystem 200 is a valid owner of the online resource. Therefore, a service provider online resource (e.g., native app, domain/URL, or any other suitable web resource, or perhaps even a service provider terminal) and/or a service provider credential and/or a service provider subsystem (e.g., SPA subsystem 202) may be associated with a particular service provider identifier 167 and at least one particular service provider key 157 (e.g., during registration at operation 502 of process 500 of FIG. 5), each of which may be securely shared between service provider subsystem 200 and administration entity subsystem 400 in any suitable manner and such an association may be accessible to administration entity subsystem 400 (e.g., in table 430) for use as a shared secret (e.g., to enable secure communication between administration entity subsystem 400 and service provider subsystem 200 (e.g., SPA subsystem 202, etc.)).

As shown in FIG. 3, and as described below in more detail, a specific example of electronic device 100 may be a handheld electronic device, such as an iPhone™, where housing 101 may allow access to various input components 110a-110i, various output components 112a-112c, and various I/O components 114a-114d through which device 100 and a user and/or an ambient environment may interface with each other. For example, a touch screen I/O component 114a may include a display output component 112a and an associated touch input component 110f, where display output component 112a may be used to display a visual or graphic user interface ("GUI") 180, which may allow a user to interact with electronic device 100. GUI 180 may include various layers, windows, screens, templates, elements, menus, and/or other components of a currently running application (e.g., application 103 and/or application 113 and/or application 143) that may be displayed in all or some of the areas of display output component 112a. For example, as shown in FIG. 3, GUI 180 may be configured to display a screen 190 with one or more graphical elements or icons 182 of GUI 180. When a specific icon 182 is selected, device 100 may be configured to open a new application associated with that icon 182 and display a corresponding screen of GUI 180 associated with that application, such as a service provider online resource application. For example, when the specific icon 182 labeled with a "S.P. App" textual indicator 181 (i.e., specific icon 183) is selected by a user of device 100, device 100 may launch or otherwise access a specific third party service provider application (e.g., a native application or hybrid application). As another example, when the specific icon 182 labeled with an "Internet" textual indicator (i.e., specific icon 184) is selected by a user of device 100, device 100 may launch or otherwise access an internet browser application that may be directed to a URL of a web resource of a specific third party service provider for providing another type of service provider online resource to device 100. As another example, when the specific icon 182 labeled with a "Wallet" textual indicator (i.e., specific icon 185) is selected by a user of device 100, device 100 may launch or otherwise access a card or pass or credential management application (e.g., a wallet or passbook application (e.g., an application 103)) that may enable a UI for a user to generate credential data for a particular type of transaction (e.g., between a financial institution credential and an SP credential on a single device or between two SP credentials on two different devices, or the like). When any application is accessed, device 100 may be operative to display screens of a specific user interface that may include one or more tools or features for interacting with that application using device 100 in a specific manner (see, e.g.; FIGS. 3A-3E for specific examples of such displays of GUI 180 during use of any suitable application (e.g., a service provider online resource 113) that may be used by a device user for any carrying out any secure transaction of device 100 (e.g., making a transaction to service provider subsystem 200 with a payment and/or SP credential (e.g., a credential of credential SSD 154a and/or SSD 154b) of device 100)). For each application, screens may be displayed on display output component 112a and may include various user interface elements. Additionally, or alternatively, for each application, various other types of non-visual information may be provided to a user via various other output components 112 of device 100. For example, in some embodiments, device 100 may not include a user interface component operative to provide a GUI but may instead provide an audio output component and mechanical or other suitable user input components for selecting and authenticating use of a payment credential and/or loyalty credential for conducting a transaction with service provider subsystem 200 and/or for conducting any other suitable secure functionality of device 100.

Referring now to FIG. 4, FIG. 4 shows further details with respect to particular embodiments of administration entity subsystem 400 of system 1. As shown in FIG. 4, administration entity subsystem 400 may be a secure platform system and may include a secure mobile platform ("SMP") broker component 440, an SMP trusted services manager ("TSM") component 450, an SMP crypto services component 460, an identity management system ("IDMS") component 470, a fraud system component 480, a hardware security module ("HSM") component 490, store component 420, and/or one or more servers 410. One, some, or all components of administration entity subsystem 400 may be implemented using one or more processor components, which may be the same as or similar to processor component 102 of device 100, one or more memory components, which may be the same as or similar to memory component 104 of device 100, and/or one or more communications components, which may be the same as or similar to communications component 106 of device 100. One, some, or all components of administration entity subsystem 400 may be managed by, owned by, at least partially controlled by, and/or otherwise provided by a single administration entity (e.g., Apple Inc.) that may be distinct and independent from any financial institution subsystem and/or from service provider subsystem 200. The components of administration entity subsystem 400 may interact with each other and collectively with any suitable financial institution subsystem 350 and/or electronic device 100 and/or service provider subsystem 200 for providing a new layer of security and/or for providing a more seamless user experience.

SMP broker component 440 of administration entity subsystem 400 may be configured to manage user authentication with an administration entity user account and/or to manage service provider validation with a service provider subsystem account. SMP broker component 440 may also be configured to manage the lifecycle and provisioning of credentials on device 100. SMP broker component 440 may be a primary end point that may control the user interface elements (e.g., elements of GUI 180) on device 100. An operating system or other application of an end user device (e.g., application 103, application 113, and/or application 143 of device 100) may be configured to call specific application programming interfaces ("APIs") and SMP broker 440 may be configured to process requests of those APIs and respond with data that may derive the user interface of device 100 and/or respond with application protocol data units ("APDUs") that may communicate with device 100 (e.g., via a communication path 25 between administration entity subsystem 400 and electronic device 100). Such APDUs may be received by administration entity subsystem 400 from financial institution subsystem 350 via a trusted services manager ("TSM") of system 1 (e.g., a TSM of a communication path between administration entity subsystem 400 and a remote subsystem (e.g., financial institution subsystem 350 and/or SP subsystem 200)). SMP TSM component 450 of administration entity subsystem 400 may be configured to provide GlobalPlatform-based services or any other suitable services that may be used to carry out credential provisioning operations on device 100 from a financial institution subsystem. GlobalPlatform, or any other suitable secure channel protocol, may enable SMP TSM component 450 to properly communicate and/or provision sensitive account data between secure element 145 of device 100 and a TSM for secure data communication between administration entity subsystem 400 and a remote subsystem.

SMP TSM component 450 may be configured to use HSM component 490 to protect keys and generate new keys. SMP crypto services component 460 of administration entity subsystem 400 may be configured to provide key management and cryptography operations that may be provided for user authentication and/or confidential data transmission between various components of system 1. SMP crypto services component 460 may utilize HSM component 490 for secure key storage and/or opaque cryptographic operations. A payment crypto service of SMP crypto services component 460 may be configured to interact with IDMS component 470 to retrieve information associated with on-file credit cards or other types of commerce credentials associated with user accounts of the administration entity (e.g., an Apple iCloud™ account). Such a payment crypto service may be configured to be the only component of administration entity subsystem 400 that may have clear text (e.g., non-hashed) information describing commerce credentials (e.g., credit card numbers) of its user accounts in memory. IDMS component 470 may be configured to enable and/or manage any suitable communication between device 100 and another device, such as an identity services ("IDS") transport (e.g., using a commercial-entity specific service (e.g., iMessage™ by Apple Inc.)). For example, certain devices may be automatically or manually registered for such a service (e.g., all devices in an eco-system of administration entity 400 may be automatically registered for the service). Such a service may provide an end-to-end encrypted mechanism that may require active registration before messages can be sent using the service. IDMS component 470 and/or any other suitable server or portion of administration entity subsystem 400 may be operative to identify or otherwise lookup the status of any credentials provisioned on any electronic devices associated with a given user account or otherwise, such that administration entity subsystem 400 may be operative to efficiently and effectively identify one or more non-native payment credentials that may be available to a particular client device associated with a particular user account (e.g., multiple devices of a family account with administration entity subsystem 400). Administration entity fraud system component 480 of administration entity subsystem 400 may be configured to run an administration entity fraud check on a commerce credential based on data known to the administration entity about the commerce credential and/or the user (e.g., based on data (e.g., commerce credential information) associated with a user account with the administration entity and/or any other suitable data that may be under the control of the administration entity and/or any other suitable data that may not be under the control of a remote subsystem). Administration entity fraud system component 480 may be configured to determine an administration entity fraud score for the credential based on various factors or thresholds. Additionally or alternatively, administration entity subsystem 400 may include store 420, which may be a provider of various services to users of device 100 (e.g., the iTunes™ Store for selling/renting media to be played by device 100, the Apple App Store™ for selling/renting applications for use on device 100, the Apple iCloud™ Service for storing data from device 100 and/or associating multiple user devices and/or multiple user profiles with one another, the Apple Online Store for buying various Apple products online, etc.). As just one example, store 420 may be configured to manage and provide an application 113 to device 100 (e.g., via communications path 25), where application 113 may be any suitable application, such as a banking application, a service provider application, an e-mail application, a text messaging application, an internet application, a card management application, or any other suitable communication application. Any suitable communication protocol or combination of communication protocols may be used by administration entity subsystem 400 to communicate data amongst the various components of administration entity subsystem 400 (e.g., via at least one communications path 495 of FIG. 4) and/or to communicate data between administration entity subsystem 400 and other components of system 1 (e.g., service provider subsystem 200 via communications path 35 of FIG. 1 and/or electronic device 100 via communications path 25 of FIG. 1).

FIG. 5 is a flowchart of an illustrative process 500 for managing secure transactions between electronic devices and service providers. Process 500 is shown being implemented by electronic device 100, service provider subsystem 200, administration entity subsystem 400, and, optionally, financial institution subsystem 350. However, it is to be understood that process 500 may be implemented using any other suitable components or subsystems. Process 500 may provide a seamless user experience for securely and efficiently managing secure transactions between electronic devices and service providers, which may include a transaction for provisioning a service provider credential of a third party service provider subsystem 200 on electronic device 100, where such a service provider credential as provisioned on electronic device 100 may then be used to access a product of service provider subsystem 200. To facilitate the following discussion regarding the operation of system 1 for personalizing service provider credentials according to process 500 of FIG. 5, reference is made to various components of system 1 of the schematic diagrams of FIGS. 1-4, and to front views of screens 190-190e of FIGS. 3-3E that may be representative of a graphical user interface of device 100 (e.g., a GUI as may be provided by a card or credential management application (e.g., a wallet or passbook application (e.g., an application 103)) and/or a service provider online resource 113 or any suitable application of device 100) during such a process. The operations described may be achieved with a wide variety of graphical elements and visual schemes. Therefore, the embodiments of FIGS. 3-3E are not intended to be limited to the precise user interface conventions adopted herein. Rather, embodiments may include a wide variety of user interface styles. While the term "service provider" may be utilized for describing service provider subsystem 200 and/or any feature thereof, such as a service provider online resource or key or server or terminal or identifier or credential, it is to be understood that subsystem 200 may be any suitable subsystem operated by any suitable third party entity that may be distinct from an owner or user of electronic device 100 and/or from administration entity subsystem 400. For example, service provider subsystem 200 may be any suitable third party subsystem that may enable a transaction for provisioning a credential or pass on device 100 and/or any suitable subsystem that may receive such credential or pass information from device 100 for furthering a transaction for granting access to a product (e.g., a transaction that may benefit an operator of device 100).

At operation 501 of process 500, SPA subsystem 202 may be registered with each SPI subsystem of SP subsystem 200 (e.g., through communication of any suitable registration data therebetween). For example, if SP subsystem 200 may include first SPI subsystem 250 and second SPI subsystem 290, each of which may communicate with administration entity subsystem 400 via SPA subsystem 202, then SPA subsystem 202 may register with each SPI subsystem. Although FIG. 5 may only show first SPI subsystem 250 registering with SPA subsystem 202, it is to be understood that more than one SPI subsystem may register with a single SPA subsystem 202 (e.g., SPI subsystem 290 may also register with SPA subsystem 202 at operation 501). Such registration of SPA subsystem 202 with an SPI subsystem may include sharing any suitable data that may enable secure communication of data therebetween in the future (e.g., at least one shared secret may be realized between SPA subsystem 202 and SPI subsystem 250 through communication (e.g., via communications path 75) at registration operation 501, such as to enable transport layer security ("TLS"), and/or any suitable API specification data may be shared between SPA subsystem 202 and SPI subsystem 250 at registration operation 501 for defining one or more APIs that may be used to define future communications between SPA subsystem 202 and SPI subsystem 250).

At operation 502 of process 500, SP subsystem 200 (e.g., SPA subsystem 202) may be registered with administration entity subsystem 400 (e.g., through communication of any suitable registration data therebetween). For example, if SP subsystem 200 may include SPA subsystem 202 that may act as a technology provider or service enabler for one or more SPI subsystems of SP subsystem 200 (e.g., first SPI subsystem 250 and/or second SPI subsystem 290 (e.g., through registration at operation 501)), each of which may then communicate with administration entity subsystem 400 via SPA subsystem 202, then SPA subsystem 202 may register with administration entity subsystem 400. Such registration of SPA subsystem 202 with administration entity subsystem 400 may include sharing any suitable data that may enable secure communication of data therebetween in the future (e.g., at least one shared secret may be realized between SPA subsystem 202 and administration entity subsystem 400 through communication (e.g., via communications path 35) at registration operation 502). For example, as mentioned, SPA subsystem 202 may be associated with a particular service provider identifier 167 and at least one particular service provider key 157 during registration at operation 502, each of which may be securely shared between service provider subsystem 200 and administration entity subsystem 400 in any suitable manner, and such an association may be accessible to administration entity subsystem 400 (e.g., in table 430) for use as a shared secret (e.g., to enable secure communication between administration entity subsystem 400 and service provider subsystem 200 (e.g., SPA subsystem 202), such as to enable transport layer security ("TLS")). Additionally or alternatively, any suitable API specification data may be shared between SPA subsystem 202 and administration entity subsystem 400 at registration operation 502 for defining one or more APIs that may be used to define future communications between SPA subsystem 202 and administration entity subsystem 400.

At operation 504 of process 500, administration entity subsystem 400 may be registered with electronic device 100. For example, to affect such registration, access data 554 may be provisioned on secure element 145 of electronic device 100 by administration entity subsystem 400 at operation 504. For example, at least one access or administration SSD (e.g., administration SSD 154c) may be provisioned on secure element 145 of device 100 at least partially by access data 554 from administration entity subsystem 400 (e.g., from server 410) in order to more securely enable device 100 to conduct a transaction with service provider subsystem 200. As mentioned, SSD 154c may be at least partially provisioned on secure element 145 of electronic device 100 directly from administration entity subsystem 400 (e.g., as access data 554 via communication path 25 between server 410 of administration entity subsystem 400 and communications component 106 of device 100, which may then be passed to secure element 145 from communications component 106 (e.g., via bus 118)). Access data 554 via path 25 may be provisioned on secure element 145 of device 100 as at least a portion or all of SSD 154c and may include applet 153c and/or key 155c. Operation 504 may be at least partially carried out when device 100 is initially configured (e.g., by administration entity subsystem 400 before device 100 is sold to a user). Alternatively, operation 504 may be at least partially carried out in response to a user of device 100 initially setting up secure element 145 of NFC component 120. Additionally or alternatively, access data 554 may include ISD key 156k for ISD 152 of secure element 145 and may be used in addition to or as an alternative to key 155c (e.g., as a shared secret) for enabling secure transmissions between administration entity subsystem 400 and electronic device 100. Any key for a shared secret between device 100 and administration entity subsystem 400 that may be associated with access data 554 may also include device identifier 119 (e.g., a unique identifier of device 100 (e.g., of device 100 generally and/or of secure element 145 specifically (e.g., an SEID))) that may be associated with the shared secret key (e.g., in table 430 of administration entity subsystem 400), such as to enable transport layer security ("TLS"). Communication at operation 504 may be initiated by either device 100 or administration entity subsystem 400 (e.g., in any suitable push or pull manner).

At operation 506 of process 500, payment or financial institution credential data 556 may be provisioned on secure element 145 of electronic device 100 by financial institution subsystem 350, in some embodiments, via administration entity subsystem 400. For example, such credential data 556 may be at least partially provisioned on secure element 145 of electronic device 100 directly from financial institution subsystem 350 or via administration entity subsystem 400 (e.g., via communications path 45 of FIG. 1A between financial institution subsystem 350 and administration entity subsystem 400, which may be passed to device 100 as credential data 556 via communications path 25 of FIG. 1A between administration entity subsystem 400 (e.g., server 410) and communications component 106 of device 100, which may then be passed to secure element 145 from communications component 106 (e.g., via bus 118)). Credential data 556 may be provisioned on secure element 145 of device 100 as at least a portion or all of financial institution credential SSD 154b and may include credential applet 153b with financial institution credential information and/or credential key 155b. Operation 506 may be at least partially carried out when a user of device 100 selects a particular payment or financial institution credential to be provisioned on device 100 (e.g., via an online resource running on device 100 or any other suitable mechanism). In some embodiments, credential data 556 may also include or otherwise use administration key 155c, which may be initially provided from administration entity subsystem 400 to financial institution subsystem 350 and/or may be added by administration entity subsystem 400 (e.g., to secure the transaction of data 556 to device 100). Communication at operation 506 may be initiated by either device 100 or administration entity subsystem 400 or financial institution subsystem 350 (e.g., in any suitable push or pull manner).

The financial institution credential information of SSD 154b that may be defined by credential data 556 and provisioned on device 100 at operation 506 may include data necessary to make a payment with that credential (e.g., to identify a funding account at financial institution subsystem for funding a transaction (e.g., with SP subsystem 200)), such as, for example, a primary account number ("PAN"), a card security code (e.g., a card verification code ("CVV")), PAN expiration date, name associated with the credential, and the like, as well as other data that may be operative for electronic device 100 to generate appropriate crypto data (e.g., any suitable shared secret and any suitable cryptographic algorithm or cipher whose functional output may be at least partially determined by the shared secret). A "virtual" credential or virtual PAN or device PAN ("D-PAN") may be provisioned on device 100 rather than the user's "actual" credential or actual PAN or funding PAN ("F-PAN") of an actual user account at financial institution subsystem 350.

At operation 508 of process 500, service provider credential data 558 may be provisioned on secure element 145 of electronic device 100 by service provider subsystem 200, in some embodiments, via administration entity subsystem 400. For example, such SP credential data 558 may be at least partially provisioned on secure element 145 of electronic device 100 directly from service provider subsystem 200 or via administration entity subsystem 400 (e.g., via communications path 35 of FIG. 1A between service provider subsystem 200 and administration entity subsystem 400, which may be passed to device 100 as SP credential data 558 via communications path 25 of FIG. 1A between administration entity subsystem 400 (e.g., server 410) and communications component 106 of device 100, which may then be passed to memory 104 and/or secure element 145 from communications component 106 (e.g., via bus 118)). SP credential data 558 may be provisioned on secure element 145 of device 100 as at least a portion or all of SP credential SSD 154a and may include credential applet 153a with SP credential information and/or SP credential key 155a. Alternatively or additionally, SP credential data 558 may be at least partially stored on memory 104 as service provider credential data 123. Operation 508 may be at least partially carried out when a user of device 100 selects a particular SP credential to be provisioned on device 100 (e.g., via an online resource running on device 100 or any other suitable mechanism). In some embodiments, credential data 558 may also include or otherwise use administration key 155c, which may be initially provided from administration entity subsystem 400 to SP subsystem 200 and/or may be added by administration entity subsystem 400 (e.g., to secure the transaction of data 558 to device 100). SP credential data 558 may include any suitable data operative to define or otherwise identify one or more actions (e.g., action data or pass data) that may be appropriately carried out by the SP credential provisioned on device 100, including, but not limited to, add value to the SP credential, decrement value from the SP credential, and the like, and/or information that may define any suitable characteristics of such actions, including, but not limited to, the maximum value that may be added to the SP credential, which may be included in any suitable structure, such as one or more JavaScript Object Notation ("JSON") files (e.g., action.json, which may be a pass file, of which certain information may be presentable to a user of device 100 (e.g., via a card management application running on processor 102 of device 100)). Communication at operation 508 may be initiated by either device 100 or administration entity subsystem 400 or SP subsystem 200 (e.g., in any suitable push or pull manner). One exemplary way in which SP credential data (e.g., additional SP credential data or SP credential data 558 of operation 508) may be updated on device 100 may be described in more detail with respect to operations 510-549 of process 500.

At operation 510 of process 500, device 100 may be operative to enable a user to generate and submit an order for adding value to an SP credential on device 100 (e.g., for adding value to an SP credential that has already been provisioned on device 100 (e.g., an SP credential provisioned at operation 508) or for adding a new SP credential of some value to device 100). As shown in FIGS. 3A-3C, any suitable application (e.g., a device application 103 (e.g., a card management (e.g., Wallet) application) or a service provider online resource or application (e.g., application 113)) may be run by device 100 for presenting a user with one or more options for generating and submitting a particular order for adding SP credential value to a device. For example, as shown in FIG. 3A, GUI 180 may provide screen 190a that may present a user query 301 asking the user whether or not service provider credential value ought to be added, as well as one or more suitable response options that may be selected by a user for responding to query 301, such as a response options 303, 305, 307, and 309. Response option 303 may be selected to decline adding any SP credential value. Response option 305 may be selected to add SP credential value to an existing "SP Credential A" on device 100 (e.g., to an SP credential that may have been provisioned on device 100 at operation 508). Response option 307 may be selected to add SP credential value to a new SP credential that has not yet been provisioned on device 100. Response option 309 may be selected to add SP credential value to a remote recipient device other than device 100 (e.g., to client device 100' of system 1 (see, e.g., FIG. 1A)), which may be identified through use of any suitable remote recipient device identifier (e.g., a telephone number or e-mail address or otherwise that may be uniquely associated with the remote recipient device (e.g., with respect to administration entity subsystem 400), similarly to device identifier 119 of host device 100). Operation 510 may include any suitable data fetches or other suitable sub-operations where updated information about one or more SP credentials may be obtained by device 100 (e.g., from administration entity subsystem 400 and/or SP subsystem 200 (e.g., via administration entity subsystem 400)). Any suitable data from SP credential data 558 (e.g., action data) may be utilized at operation 510 and/or any updated or additional information may be fetched at operation 510 to present any suitable options or to enable any suitable selections or definitions of an order by device 100. Additionally, before or after presenting screen 190a for potentially selecting what target SP credential to add value to (e.g., with one of response options 305-309), GUI 180 may provide screen 190b, as shown in FIG. 3B, that may present a user query 311 asking the user how to fund an addition of SP credential value, as well as one or more suitable response options that may be selected by a user for responding to query 311, such as a response options 313, 315, 317, and 319. For example, one of response options 313 and 315 may be selected to choose a particular existing financial institution ("FI") credential that may have already been provisioned on device 100 at operation 506, such as "FI Credential A" or "FI Credential B" that may be associated with different funding accounts of financial institution subsystem 350. Additionally or alternatively, one of response options 317 and 319 may be selected to choose a particular existing SP credential that may have already been provisioned on device 100 at operation 508, such as "SP Credential A" or "SP Credential B" that may be associated with different SP credentials of SP subsystem 200 (e.g., of SPI subsystem 250 and/or of SPI subsystem 290). Next, after a selection of a target SP credential to add value to (e.g., with one of response options 305-309 of FIG. 3A) and after a selection of a funding source for new SP credential value (e.g., with one of response options 313-319 of FIG. 3B), GUI 180 may provide screen 190c, as shown in FIG. 3C, that may present a user query 321 that may enable a user to edit a previous selection of a target SP credential for adding value with option 323 (e.g., one of responses 305, 307, and 309 of screen 190a) and/or of a funding credential with option 325 (e.g., one of responses 313, 315, 317, and 319 of screen 190b). Moreover, screen 190c may provide a user with the ability at option 327 to select an SP value to be added to the target SP credential of option 323 (e.g., $80 value that may be decremented or a monthly subscription or a single transit pass, etc.). Alternatively or additionally, screen 190c may provide a user with the ability at option 329 to select a funding amount to be funded by the funding credential of option 325 (e.g., a specific monetary value that may be required to fund the desired new SP credential value). Finally, also at operation 510, screen 190c of FIG. 3C may prompt a user to interact with device 100 in one or more ways to authenticate the user and its intent to utilize the selected funding credential of option 325 with an authentication and order submission prompt 331. Use of authentication prompt 331 may include prompting the user to enter user authentication via personal identification number ("PIN") entry or via user interaction with a biometric sensor in order to access the secure element of device 100 and, thus, the funding credential of option 325 to be used for funding the SP value order being submitted. Access SSD 154c may leverage applet 153c to determine whether such authentication has occurred before allowing other SSDs 154 (e.g., a credential SSD 154 associated with the selected funding credential of option 325) to be used for enabling its credential information as funding information in a device order for SP value. As just one example of operation 510, applet 153c of access SSD 154c may be configured to determine intent and local authentication of a user of device 100 (e.g., via one or more input components 110, such as a biometric input component 110i of FIG. 3, as may be used by a user interacting with an application via GUI 180) and, in response to such a determination, may be configured to enable another particular SSD for funding an SP value order transaction (e.g., with a credential of credential SSD 154a or of credential SSD 154b).

Once authentication information has been provided at operation 510 for a particular order, process 500 may advance to operation 512 where such authentication information and any other suitable order information (e.g., as defined at screen 190c) may be provided by processor 102 to secure element 145 as order request data 562. For example, order request data 562 may include not only any suitable authentication information provided by a user, but also identification of a funding credential (e.g., of option 325 (e.g., an applet identifier of an FI credential on secure element 145 (e.g., applet 153b) or an applet identifier of an SP credential on secure element 145)) and/or a funding amount (e.g., of option 329) and/or a target SP credential for added value (e.g., of option 323 (e.g., an applet identifier of an SP credential on secure element 145 (e.g., applet 153a) and/or an identifier of a particular SPI subsystem (e.g., SPI ID 267) and/or an identifier of a particular SPA subsystem (e.g., SPA ID 167) and/or an identifier of a recipient device (e.g., device identifier of host device 100 or of client device 100'))) and/or a particular value to be added (e.g., of option 327). Certain portions of order request data 562 may be indicative of a selection of one or more actions (e.g., add value/top-up) that may be defined by any suitable action data (e.g., of SP credential data 558) that may be associated with a particular SP credential to be used (e.g., updated) with the order.

Next, at operations 514 and 516, process 500 may include device 100 (e.g., secure element 145) generating, encrypting, and transmitting payment data 564 as at least a portion of order response data 566 back to processor 102 of device 100. Such payment data 564 may be generated as any suitable funding or payment instrument for inclusion in an SP value order from device 100 through use of the funding credential identified by order request data 562 of operation 512 (e.g., the funding credential of option 325 of screen 190*c* (e.g., of a user order sheet)). Once the funding credential on secure element 145 of device 100 has been selected, authenticated, and/or enabled for use in generating a funding instrument (e.g., based on the identification of the funding credential and the authentication information of order request data 562, secure element 145 of device 100 (e.g., processor module 142 of NFC component 120) may generate and encrypt certain credential data of that selected funding credential for use by administration entity subsystem 400. For example, secure element ("SE") funding credential data of an applet of the selected funding credential SSD (e.g., financial institution credential data of SSD 154*b* (e.g., token data and crypto data operative to securely identify a funding account of financial institution subsystem 350) or SP credential data of SSD 154*a* (e.g., any suitable value data from a provisioned SP credential (e.g., a monetary value or certain access data))) may be generated and/or at least partially encrypted and/or encoded with a credential key of that funding credential SSD (e.g., key 155*a* or key 155*b*) at operation 514 as encrypted funding credential data, such that such encrypted funding credential data may only be decrypted and/or decoded by an entity with access to that credential key (e.g., financial institution subsystem 350 or SP subsystem 200) for accessing the generated funding credential data. That funding credential data may include all data necessary to fund an acquisition of new SP credential value from SP subsystem 200 (e.g., from an SP subsystem responsible for adding value to the SP credential identified by option 323), such as, for example, a primary account number (e.g., an actual F-PAN or a virtual D-PAN), a card security code (e.g., a card verification code ("CVV")), expiration date, name associated with the credential, associated crypto data (e.g., a cryptogram generated using a shared secret between secure element 145 and financial institution subsystem 350 and any other suitable information), and/or the like when the funding credential is a financial institution funding credential or one or more suitable value scripts when the funding credential is an SP credential. In some embodiments, once some or all of that funding credential data of a funding credential SSD has been encrypted with a key of that funding credential SSD at operation 514, which may provide payment data 564, that encrypted funding credential data, either alone or along with at least a portion if not all of any other suitable order data of order request data 562 (e.g., identification of a funding credential (e.g., of option 325 (e.g., an applet identifier)) and/or a funding amount (e.g., of option 329) and/or a target SP credential for added value (e.g., of option 323 (e.g., an identifier of a particular SPI subsystem (e.g., SPI ID 267) and/or of a particular SPA subsystem (e.g., SPA ID 167) and/or an identifier of a recipient device (e.g., device identifier of host device 100 or of client device 100'))) and/or a particular value to be added (e.g., of option 327)), may be encrypted by access information (e.g., by administration key 155*c* of access SSD 154*c* and/or ISD key 156*k* of ISD 152) at operation 514 as encrypted administration entity ("AE") funding credential data, which may provide payment data 564. For example, secure element 145 of device 100 (e.g., processor module 142 of NFC component 120) may use access information to encrypt not only an identification of the SP subsystem to add SP credential value, but also the identification of the amount of the funding and/or amount of value to be funded, as well as the encrypted finding credential data of the funding credential SSD into encrypted AE credential data for providing payment data 564. In some embodiments, funding credential data of the finding credential SSD may be generated but not encrypted with a credential key before being encrypted with an access key, and, instead, such funding credential data may be encrypted with an access key and provided as payment data 564 that is not encrypted with any credential key. In some embodiments, such an access key may be an administration entity public key associated with a scheme of administration entity subsystem 400 and of which administration entity subsystem 400 may have access to an associated administration entity private key (e.g., key 155*c*). Administration entity subsystem 400 may provide such an administration entity public key to financial institution subsystem 350 and financial institution subsystem 350 may then share that administration entity public key with device 100 (e.g., when provisioning financial institution credential data on device 100 (e.g., at operation 506 of process 500)) and/or to SP subsystem 200 and SP subsystem 350 may then share that administration entity public key with device 100 (e.g., when provisioning SP credential data on device 100 (e.g., at operation 508 of process 500)).

Next, payment data 564 along with any additional information, such as at least some of order request data 562 or otherwise that may be indicative of the order (e.g., identification of a funding credential (e.g., of option 325 (e.g., an applet identifier)) and/or a funding amount (e.g., of option 329) and/or a target SP credential for added value (e.g., of option 323 (e.g., an identifier of a particular SPI subsystem (e.g., SPI ID 267) and/or of a particular SPA subsystem (e.g., SPA ID 167) and/or an identifier of a recipient device (e.g., device identifier of host device 100 or of client device 100'))) and/or a particular value to be added (e.g., of option 327) and/or any other suitable information (e.g., any information identifying device 100 itself, a unique device-based transaction or order identifier, and/or the like) may together be transmitted as order response data 566 at operation 516 from secure element 145 to processor 102 and/or from processor 102 to administration entity subsystem 400 as transaction order data or device order data 568 at operation 518. Therefore, at least portions of device order data 664 (e.g., encrypted AE funding credential data) may only be decrypted by an entity with access to that access information used for the encryption (e.g., administration key 155*c* and/or ISD key 156*k*) that generated encrypted AE funding credential data of payment data 564 of device order data 568 (e.g., administration entity subsystem 400). Such device order data 568 may be generated at operations 514-518 and then transmitted to administration entity subsystem 400 (e.g., via communications component 106 and communication path 25). Operations 514-518 may ensure that any funding credential data generated and transmitted from secure element 145 of device 100 as part of device order data 568 has first been encrypted in such a way that it cannot be decrypted by another portion of device 100. That is, funding credential data of device order data 568 may be encrypted as encrypted funding credential data with a funding credential key that may not be exposed to or accessible by any portion of device 100 outside of its secure element. Moreover, such encrypted funding credential data of device order data 568 may be encrypted as encrypted AE funding credential data with an access key (e.g., administration key 155*c* and/or 156*k* (e.g., referred to herein as "access information")) that may not be exposed to or accessible by any portion of device 100 outside of its secure element. Therefore, device order data 568 communicated from device 100 to administration entity subsystem 400 may define an order that may include order data identifying a payment instrument and order data identifying an item to be funded, where the order data identifying the payment instrument may include the funding credential data of payment data 564 that may be operative to securely identify a funding source (e.g., a user account at financial institution subsystem 350 and/or stored value of an SP credential provisioned by SP subsystem 200 (e.g., as may be identified by option 325)) as well as an amount of value of that funding source to be used for funding (e.g., as may be identified by option 329), and where the order data identifying an item to be funded may be any suitable data identifying an SP credential and value to be added to that SP credential (e.g., as may be identified by options 323 and 327), which may identify any suitable SP product (e.g., goods or services) of an SP subsystem or any suitable SP credential value to be stored on a device for use in accessing other SP product of an SP subsystem as well as a recipient device for that value (e.g., an identifier of a recipient device (e.g., device identifier of host device 100 or of client device 100')). For example, the order data identifying the item may include data defining an object specifying what SP credential is being purchased (e.g., funded) by the order, such as a description identifying the item being purchased (e.g., a description that may be entered and/or edited by a user (e.g., at option 323 and/or option 327) and/or that may be at least partially generated by system 1 (e.g., by device 100 and/or by any other suitable subsystem of system 1)) and may include context about the particular order, such as an object with one or more keys inside the object that may be defined by SPA subsystem 202 (e.g., an SPA implementer) and/or administration entity subsystem 400 (e.g., at operation 502) and may include any data that may be required by SPA subsystem 202 to process the order request. For example, such an object may include one or more keys that may be item-type specific and may be defined as a contract between administration entity subsystem 400 and SPA subsystem 202. The order data identifying the item may include any suitable data indicative of a selection of one or more actions (e.g., add value/top-up) that may be defined by any suitable action data (e.g., of SP credential data 558) that may be associated with a particular SP credential to be used (e.g., updated) with the order. Such actions of the action data for an SP credential may be defined by SP subsystem 200 and/or administration entity subsystem 400 prior to use on device 100 for generating an order, where such action data may be a portion of a contract between SP subsystem 200 and administration entity subsystem 400 to enable the order and value transaction of process 500.

Next, at operation 520 of process 500, administration entity subsystem 400 may receive and process device order data 568 for generating administration order data 570. For example, administration entity subsystem 400 may receive device order data 568 and may then decrypt encrypted AE funding credential data of device order data 568 using access information as available at administration entity subsystem 400 (e.g., key 155c and/or key 156k (e.g., a shared secret between administration entity subsystem 400 and device 100)). This may enable administration entity subsystem 400 to determine an unencrypted identification of the service provider subsystem that may be the target for the order (e.g., SP subsystem 200 that may be identified by any suitable SP identification data in device order data 568 (e.g., SPI ID 267 and/or SPA ID 167 that may be associated with a target SP identified by option 323)), while also maintaining funding credential data of payment data 564 in an encrypted state (e.g., as encrypted funding credential data), because administration entity subsystem 400 may not have access to a funding credential key (e.g., key 155a or key 155b) with which such funding credential data may have been encrypted by secure element 145 of device 100 at operation 514 as encrypted funding credential data of payment data 564. Additionally or alternatively, the identification of the service provider subsystem that may be the target for the order (e.g., a target SP subsystem) may be identified by the additional data that may have been included in order response data 566 and/or device order data 568 along with payment data 564 (e.g., along with encrypted funding credential data). Device order data 568 may include any suitable information identifying device 100 (e.g., device identifier 119) or at least its secure element 145, such that, when device order data 568 is received by administration entity subsystem 400, administration entity subsystem 400 may know which access information (e.g., which of key 155c and/or key 156k) to use at operation 520 to decrypt at least a portion of device order data 568. For example, administration entity subsystem 400 may have access to multiple access keys and/or multiple ISD keys, each one of which may be particular to a specific device (e.g., host device 100 or client device 100') or to a specific secure element of a specific device.

Next, also at operation 520 of process 500, after administration entity subsystem 400 may identify the service provider subsystem that is the target for the order (e.g., through certain processing of device order data 568 at operation 520, administration entity subsystem 400 may identify an SP key (e.g., SPA key 157) that may be associated with that identified target service provider subsystem and then re-encrypt at least a portion of device order data 568 using that SP key. That is, after decrypting at least a portion of device order data 568 using suitable access information at operation 520 (e.g., after decrypting the encrypted AE funding credential data of device order data 568 to realize the encrypted SE funding credential data of payment data 564 and any other information that may have been included in device order data 568), administration entity subsystem 400 may then, at operation 520, re-encrypt at least a portion of decrypted device order data 568 (e.g., the encrypted SE funding credential data of payment data 564) with an appropriate SP key 157 that may be associated with target SP information identified in device order data 568. For example, such an SP key 157 may be determined by comparing target SP identifier information identified in device order data 568 with data in table 430 of administration entity subsystem 400. With this determined appropriate SP key 157, administration entity subsystem 400 may re-encrypt with SP key 157 at least a portion of device order data 568 (e.g., encrypted SE funding credential data of payment data 564) as encrypted SP funding credential data. Such encrypted SP funding credential data may be generated at operation 520 as at least a portion of administration order data 570 and then such administration order data 570 may be transmitted to the target SP subsystem at operation 522. For example, administration order data 570 may include such encrypted SP funding credential data and any other suitable data, such as any suitable data from device order data 568, including, but not limited to, identification of a funding credential (e.g., of option 325) and/or a funding amount (e.g., of option 329) and/or a target SP credential for added value (e.g., of option 323 (e.g., an identifier of a particular SPI subsystem (e.g., SPI ID 267) and/or of a particular SPA subsystem (e.g., SPA ID 167) and/or an identifier of a recipient device (e.g., device identifier of host device 100 or of client device 100'))) and/or a particular value to be added (e.g., of option 327) and/or any other suitable information (e.g., any information identifying device 100 itself, a unique device-based transaction or order identifier, a unique administration-based transaction or order identifier generated by administration entity subsystem 400, and/or the like). For example, while device order data 568 may include not only SPA ID 167 but also SPI ID 267, administration entity subsystem 400 may only utilize SPA ID 167 to identify SP key 157 for use in encrypting the encrypted SE funding credential data of device order data 568 as the encrypted SP funding credential data of administration order data 570 (e.g., only SPA ID 167, and not SPI ID 267, may be identified in table 430 by administration entity subsystem 400 (e.g., for use in identifying SP key 157 to do such encryption)) and/or for use in defining the target SP subsystem for the communication of administration order data 570 from administration entity subsystem 400 at operation 522 (e.g., SPA subsystem 202 associated with that SPA ID 167). However, SPI ID 267 of device order data 568 may be included in administration order data 570 for later use by that target SPA subsystem 202 (e.g., to identify SPI subsystem 250 for targeting SPA order data 574 at operation 526). In some embodiments, operation 520 may include administration entity subsystem 400 ensuring that an SP subsystem associated with the identified target SP information (e.g., SPA subsystem 202 that may be associated with SPA ID 167 of device order data 568) is an SP subsystem that is currently trusted by administration entity subsystem 400 before enabling the encryption of operation 520 and/or communication of data 570 at operation 522. For example, at operation 520, administration entity subsystem 400 may be operative to ensure that SPA subsystem 202 has been properly registered with administration entity subsystem 400 (e.g., at operation 502) and is still a trusted partner before administration entity subsystem 400 may proceed with the encryption of operation 520 and/or the communication of data 570 at operation 522. Therefore, communication of device order data 568 between device 100 and administration entity subsystem 400 prior to certain communication of order data to SP subsystem 200 may enable administration entity subsystem 400 to perform any suitable fraud check and/or validation and/or confirmation of SP subsystem 200 (e.g., to protect an order being made by device 100). Operations 520 and 522 may be operative to ensure that finding SP credential data transmitted from administration entity subsystem 400 as part of administration order data 570 may be encrypted in such a way that it cannot be decrypted by any entity that does not have access to SP key 157 (e.g., a shared secret between SP subsystem 200 and administration entity subsystem 400, which may have been shared at operation 502). Administration order data 570 may then be forwarded on to SP subsystem 200 (e.g., server 204 of SPA subsystem 202) by administration entity subsystem 400 via communications path 35 using any suitable protocol at operation 522. Alternatively, although not shown, rather than sharing administration order data 570 with SP subsystem 200 via path 35 at operation 522, administration entity subsystem 400 may share administration order data 570 with SP subsystem 200 via device 100 (e.g., via communications path 25 and then communications path 15 and/or as contactless proximity-based communication 5).

Once such administration order data 570 is received by SP subsystem 200 (e.g., by SPA subsystem 202), SP subsystem 200 may be operative to process such administration order data 570 for generating SPA order data 574 at operation 524. For example, SPA subsystem 202 may receive administration order data 570 and may then decrypt encrypted SP funding credential data of administration order data 570 using SP information as available at SPA subsystem 202 (e.g., SPA key 157 (e.g., a shared secret between SP subsystem 200 and administration entity subsystem 400)). This may enable SPA subsystem 202 to determine an unencrypted identification of the service provider issuer subsystem that may be the target for the order (e.g., SPI subsystem 250 that may be identified by any suitable SP identification data in device order data 568 (e.g., SPI ID 267 that may be associated with a target SP identified by option 323) rather than SPI subsystem 290 or any other SPI subsystem that may also be associated with SPA subsystem 202), while also maintaining SE funding credential data of payment data 564 in an encrypted state (e.g., as encrypted SE funding credential data), because SPA subsystem 202 may not have access to a funding credential key (e.g., key 155a or key 155b) with which such funding credential data may have been encrypted by secure element 145 of device 100 at operation 514 as encrypted SE funding credential data of payment data 564. Additionally or alternatively, the identification of the service provider subsystem that may be the target for the order (e.g., a target SPI subsystem) may be identified by the additional data that may have been included in order response data 566 and/or device order data 568 along with payment data 564 (e.g., along with encrypted SE funding credential data) and/or by the additional data that may have been included in administration order data 570. Administration order data 570 may include any suitable information identifying the target SPI subsystem (e.g., SPI ID 267 of SPI subsystem 250), such that, when administration order data 570 is received by SPA subsystem 202, SPA subsystem 202 may identify, based on that identifying information, a shared secret with the target SPI subsystem (e.g., an SPA-SPI shared secret key (e.g., a key that may have been shared at operation 501)) to use at operation 524 to encrypt at least a portion of administration order data 568.

For example, also at operation 524 of process 500, after SPA subsystem 202 may identify the service provider subsystem that is the target for the order (e.g., through certain processing of administration order data 570 at operation 524, SPA subsystem 202 may identify a shared secret with the target SPI subsystem (e.g., an SPA-SPI shared secret key (e.g., a key that may have been shared at operation 501)) that may be associated with that identified target service provider subsystem and then re-encrypt at least a portion of administration order data 570 using that SPA-SPI key. That is, after decrypting at least a portion of administration order data 570 using suitable SPA key information at operation 524 (e.g., after decrypting the encrypted SP funding credential data of administration order data 570 using SPA key 157 (e.g., a shared secret between AE subsystem 400 and SPA subsystem 202) to realize the encrypted SE funding credential data of payment data 564 and any other information that may have been included in administration order data 568), SPA subsystem 202 may then, at operation 524, re-encrypt at least a portion of decrypted administration order data 570 (e.g., the encrypted SE funding credential data of payment data 564) with an appropriate SPA-SPI shared secret key that may be associated with target SP information identified in administration order data 570. For example, such an SPA-SPI shared secret key 155d may be determined by comparing target SP identifier information identified in administration order data 570 with data in a table of SPA subsystem 202. With this determined appropriate SPA-SPI key 155d, SPA subsystem 202 may re-encrypt with SPA-SPI key 155d at least a portion of administration order data 570 (e.g., encrypted SE funding credential data of payment data 564) as encrypted SPI funding credential data. Such encrypted SPI funding credential data may be generated at operation 524 as at least a portion of SPA order data 574 and then such SPA order data 574 may be transmitted to the target SPI subsystem at operation 526. For example, SPA order data 574 may include such encrypted SPI funding credential data and any other suitable data, such as any suitable data from device order data 568, including, but not limited to, identification of a funding credential (e.g., of option 325) and/or a funding amount (e.g., of option 329) and/or a target SP subsystem/SP credential for added value (e.g., of option 323 (e.g., an identifier of a particular SPI subsystem (e.g., SPI ID 267) and/or of a particular SPA subsystem (e.g., SPA ID 167) and/or an identifier of a recipient device (e.g., device identifier of host device 100 or of client device 100'))) and/or a particular value to be added (e.g., of option 327) and/or any other suitable information (e.g., any information identifying ordering device 100 itself, a unique device-based transaction or order identifier, a unique administration-based transaction or order identifier generated by administration entity subsystem 400, a unique SPA-based transaction or order identifier generated by SPA subsystem 202, and/or the like). For example, while administration order data 570 may include not only SPA ID 167 but also SPI ID 267, SPA subsystem 202 may only utilize SPI ID 267 to identify SPI key 155a for use in encrypting the encrypted SE funding credential data of administration order data 570 as the encrypted SPI funding credential data of SPA order data 574 (e.g., only SPI ID 267, and not SPA ID 167, may be identified in a table by SPA subsystem 202 (e.g., for use in identifying SPI key 155a to do such encryption)) and/or for use in defining the target SPI subsystem for the communication of SPA order data 574 from SPA subsystem 202 at operation 526 (e.g., SPI subsystem 250 associated with that SPI ID 267). However, SPA ID 167 of administration order data 570 may be included in SPA order data 574 for later use by that target SPI subsystem 250 (e.g., to identify SPA subsystem 202 for responding to SPA order data 574 with any suitable response data (e.g., SPI purchase object data 584 at operation 534 and/or SPI value data 592 at operation 542)). In some embodiments, operation 524 may include SPA subsystem 202 ensuring that an SPI subsystem associated with the identified target SPI information (e.g., SPI subsystem 250 that may be associated with SPI ID 267 of administration order data 570) is an SP subsystem that is currently trusted by SPA subsystem 202 before enabling the encryption of operation 524 and/or communication of data 574 at operation 526. For example, at operation 524, SPA subsystem 202 may be operative to ensure that SPI subsystem 250 has been properly registered with SPA subsystem 202 (e.g., at operation 501) and is still a trusted partner before SPA subsystem 202 may proceed with the encryption of operation 524 and/or the communication of data 574 at operation 526. Therefore, communication of administration order data 570 between administration entity subsystem 400 and SPA subsystem 202 prior to certain communication of SPA order data 574 to SPI subsystem 250 may enable SPA subsystem 202 to perform any suitable fraud check and/or validation and/or confirmation of SPI subsystem 250 (e.g., to protect an order being made by device 100). Operations 524 and 526 may be operative to ensure that encrypted SPI funding credential data transmitted from SPA subsystem 202 as part of SPA order data 574 may be encrypted in such a way that it cannot be decrypted by any entity that does not have access to SPA-SPI key 155d (e.g., a shared secret between SPA subsystem 202 and SPI subsystem 250). SPA order data 574 may then be forwarded on to SPI subsystem 250 (e.g., server 210 of SPI subsystem 250) by SPA subsystem 202 via communications path 75 using any suitable protocol at operation 526.

Once such SPA order data 574 is received by SPI subsystem 250, SPI subsystem 250 may be operative to process such SPA order data 574 for identifying order payment data 578 at operation 528. For example, SPI subsystem 250 may receive SPA order data 574 and may then decrypt encrypted SPI funding credential data of SPA order data 574 using SP information as available at SPI subsystem 250 (e.g., SPA-SPI key 155d (e.g., a shared secret between SPI subsystem 250 and SPA subsystem 202) that may be identified at operation 528 using SPA ID 167 and a table of SPI subsystem 250). This may enable SPI subsystem 250 to determine encrypted SE funding credential data of payment data 564 by decrypting encrypted SPI funding credential data of SPA order data 574. Processing of operation 528 may reveal any suitable information of SPA order data 574, such as any suitable data from device order data 568, including, but not limited to, identification of a funding credential (e.g., of option 325) and/or identification of a funding amount (e.g., of option 329) and/or identification of a target SP subsystem/SP credential for added value (e.g., of option 323 (e.g., an identifier of a particular SPI subsystem (e.g., SPI ID 267) and/or of a particular SPA subsystem (e.g., SPA ID 167) and/or an identifier of a recipient device (e.g., device identifier of host device 100 or of client device 100'))) and/or identification of a particular value to be added (e.g., of option 327) and/or any other suitable information (e.g., any information identifying ordering device 100 itself, a unique device-based transaction or order identifier generated by ordering device 100, a unique administration-based transaction or order identifier generated by administration entity subsystem 400, a unique SPA-based transaction or order identifier generated by SPA subsystem 202, and/or the like). For example, identification at operation 528 of a funding credential and/or an entity responsible for the funding credential may be combined with the obtained encrypted SE funding credential data of payment data 564 (e.g., order payment data 578) to communicate that order payment data to the appropriate entity for processing and funding. As shown, for example, at operation 528, SPI subsystem 250 may identify order payment data 578 (e.g., the encrypted SE funding credential data of payment data 564) and a responsible entity of that payment data, such as financial institution subsystem 350 for SE funding credential data from a financial institution credential provisioned on device 100 (e.g., from an FI SSD 154b (e.g., provisioned at operation 506)), and then, at operation 528a, SPI subsystem 250 may communicate such order payment data 578 with the identified responsible entity (e.g., financial entity subsystem 350 via communications path 55) for enabling the order to be funded. For example, at operation 528a, financial institution subsystem 350 may receive the encrypted SE funding credential data of payment data 564 (e.g., of order payment data 578) from SPI subsystem 250 along with any other suitable data (e.g., a funding amount (e.g., of option 329) and/or identification of the target SP subsystem/SP credential for added value (e.g., of option 323) that may be included in SPA order data 574 or otherwise), and then financial institution subsystem 350 may decrypt the encrypted SE funding credential data (e.g., with key 155b, which may be a shared secret between financial institution subsystem 350 and ordering device 100 that generated the encrypted SE funding credential data) to validate and reveal the funding credential data, and then financial institution subsystem 350 may determine whether the funding credential data may identify a funding account with the requested funding amount (e.g., of option 329), and then financial institution subsystem 350 may confirm or deny the funding of the order for the benefit of SP subsystem 200 (e.g., for the benefit of SPI subsystem 250). That is, operation 528a may result in financial institution subsystem 350 authorizing a transfer of funds from an account at financial entity subsystem 350 identified by the funding credential data of the order data to SPI subsystem 250 or to an account associated with SPI subsystem 250 (e.g., an account of an acquiring bank associated with SPI subsystem 250), such that SPI subsystem 250 may receive benefit of the funding credential data from the order generated by device 100 when payment data 564 generated by device 100 includes funding credential data from a financial institution credential of device 100 (e.g., from financial institution SSD 154b (e.g., as provisioned at operation 506)). Alternatively, if the funding credential data of payment data 564 (e.g., of order payment data 578) is determined to be the responsibility of SPI subsystem 250 (e.g., through processing of SPA order data 574 at operation 528), such as when payment data 564 generated by device 100 includes funding credential data from an SP credential of device 100 (e.g., from an SP SSD 154a (e.g., as provisioned at operation 508)), then operation 528 may also include SPI subsystem 250 authorizing or confirming a transfer of funds or value back to SPI subsystem 250 from device 100 (e.g., the encrypted SE funding credential data of payment data 564 (e.g., of order payment data 578) may be decrypted by SPI subsystem 250 (e.g., using device-SPI shared secret SPI key 155a) and/or the funding credential data may be used by SPI subsystem 250 to reclaim SP value from device 100 (e.g., value that had been previously provisioned on device 100 by SPI subsystem 250 (e.g., at operation 508))).

When the funds or other suitable value identified by the funding credential data of payment data 564 (e.g., of order payment data 578) may be authorized and/or confirmed as received by SPI subsystem 250 at operation 528 and/or operation 528a for funding the order requested by device 100 (e.g., the order that may be identified by device order data 568 and/or administration order data 570 and/or SPA order data 574), SPI subsystem 250 may be operative to generate service provider value ("SPV") data 590 at operation 540 for fulfilling the funded order. For example, SPI subsystem 250 may be operative to generate any suitable SPV data 590 that may be shared (e.g., as an item of value) with an appropriate recipient electronic device (e.g., ordering host electronic device 100 or any suitable recipient device (e.g., client device 100') that may be identified by the order data (e.g., device identifier information (e.g., of option 323))), where such SPV data 590 may be generated based on any suitable data, including, but not limited to, a funding amount of order data 574 (e.g., of option 329) and/or identification of the target SP subsystem/SP credential for added value of order data 574 (e.g., of option 323) and/or the value (e.g., of option 329) of the received funds for the order (e.g., at operation 528 and/operation 528a) and/or identification of a particular value to be added (e.g., of option 327). SPV data 590 may be an actual monetary value that may be stored on a recipient device (e.g., in a secure element or otherwise) and decremented by a particular monetary value when used by the recipient device to gain access to an SP product of that value (e.g., SPV data 590 may be $80 to be stored on a stored value card on a recipient device (e.g., in applet 153a of SP credential SSD 154a) and then decremented by a certain amount (e.g., through a truth-on-card script handshake or any suitable command to update value on the secure element) when the recipient device uses credential data of the stored value card to gain access to SP product (e.g., $12.37 to pay for a ride of that value as provided by a ride providing service provider or $2 to gain access to a single ride on a transit system service provider or $5 to gain access to a transit system of a service provider for 5 consecutive hours)). In some embodiments, where SPV data 590 may be operative to be stored in an SP credential SSD on secure element 145 of device 100, at least a portion of that SPV data may be encrypted with a shared secret of SP subsystem 200 and that SP credential SSD (e.g., key 155a), which may later be decrypted on device 100 using that shared secret when such SPV data may be received by that SP credential SSD (e.g., at operation 547). As another example, SPV data 590 may be valued by its ability to grant SP product access of a certain type, where SPV data 590 may be stored on a recipient device (e.g., in a secure element or otherwise) and decremented by any suitable unit or completely removed or just authenticated when used by the recipient device to gain access to an SP product (e.g., SPV data 590 may be indicative of 10 single admission passes to an SP product that can be stored on a stored value card on a recipient device and then decremented by a certain amount when the recipient device uses credential data of the stored value card to gain access to SP product (e.g., 2 passes to gain access for two people to a zoo), or SPV data 590 may be stored on a recipient device and then be authenticated by an SP subsystem during use to prove authority to access a certain SP product (e.g., to prove ownership of a monthly all access subscription to data SP product of an SP website or to prove ownership of a monthly all access pass to a transit system SP product)). Such SPV data 590 may include any suitable scripts (e.g., personalization scripts) and/or APDUs or other suitable data that may successfully store actual value on a recipient device (e.g., on a secure element or otherwise) for later use by the recipient device to access an SP product. Certain SPV data 590 may include any suitable data that may be presented by the recipient device (e.g., via any suitable output component and/or communication component) as a particular code or redeemable data structure (e.g., QR code) that may be scanned or otherwise detected by the SP subsystem for authenticating the SP value stored on and/or being presented by the recipient device.

At operation 542 of process 500, SPI subsystem 250 may communicate SPV data 590 as at least a portion of SPI value data 592 to SPA subsystem 202 (e.g., via communications path 75 using any suitable communications protocol). SPI value data 592 may include any other suitable data along with SPV data 590 including, but not limited to, data identifying a funding credential (e.g., of option 325) for SPV data 590 and/or data identifying a funding amount (e.g., of option 329) for SPV data 590 and/or data identifying a target SP subsystem/SP credential for added value (e.g., of option 323 (e.g., an identifier of a particular SPI subsystem (e.g., SPI ID 267) and/or of a particular SPA subsystem (e.g., SPA ID 167) and/or an identifier of a recipient device (e.g., device identifier of host device 100 or of client device 100')) and/or an identifier of a particular SP credential existing on a device or to be provisioned on a device) of SPV data 590 and/or data identifying a particular value to be added (e.g., of option 327) by SPV data 590 and/or any other suitable information (e.g., any information identifying ordering device 100 itself, a unique device-based transaction or order identifier generated by ordering device 100, a unique administration-based transaction or order identifier generated by administration entity subsystem 400, a unique SPA-based transaction or order identifier generated by SPA subsystem 202, a unique SPI-based transaction or order identifier generated by SPI subsystem 250), and/or the like). In some embodiments, at least SPV data 590 or more or all data of SPI value data 592 may be encrypted or otherwise secured using a shared secret between SPI subsystem 250 and SPA subsystem 202 prior to communicating SPI value data 592 to SPA subsystem 202 at operation 542 (e.g., SPA-SPI key 155d), such that SPV data 590 may be securely communicated from SPI subsystem 250 without fear of being intercepted and used by an untrusted entity.

At operation 544 of process 500, SPA subsystem 202 may communicate at least SPV data 590 of SPI value data 592 as at least a portion of SPA value data 594 (e.g., order fulfillment data) to administration entity subsystem 400 (e.g., via communications path 35 using any suitable communications protocol). SPA subsystem 202 may identify administration entity subsystem 400 as a target for such SPV data by identifying any suitable data from SPI value data 592, such as a device identifier of the recipient device, which may be determined by SPA subsystem 202 to be a device registered with administration entity subsystem 400. SPA value data 594 may include any other suitable data along with SPV data 590 including, but not limited to, data identifying a funding credential (e.g., of option 325) for SPV data 590 and/or data identifying a funding amount (e.g., of option 329) for SPV data 590 and/or data identifying a target SP subsystem/SP credential for added value (e.g., of option 323 (e.g., an identifier of a particular SPI subsystem (e.g., SPI ID 267) and/or of a particular SPA subsystem (e.g., SPA ID 167) and/or an identifier of a recipient device (e.g., device identifier of host device 100 or of client device 100'')) and/or an identifier of a particular SP credential existing on a device or to be provisioned on a device) of SPV data 590 and/or data identifying a particular value to be added (e.g., of option 327) by SPV data 590 and/or any other suitable information (e.g., any information identifying ordering device 100 itself, a unique device-based transaction or order identifier generated by ordering device 100, a unique administration-based transaction or order identifier generated by administration entity subsystem 400, a unique SPA-based transaction or order identifier generated by SPA subsystem 202, a unique SPI-based transaction or order identifier generated by SPI subsystem 250), and/or the like). In some embodiments, at least SPY data 590 of SPA value data 594 may be encrypted or otherwise secured using a shared secret between SPA subsystem 202 and administration entity subsystem 400 (e.g., SPA key 157) prior to communicating SPA value data 594 to administration entity subsystem 400 at operation 544, such that SPV data 590 may be securely communicated from SPA subsystem 202 without fear of being intercepted and used by an untrusted entity. In some embodiments, at least SPV data 590 of SPI value data 592 may first be decrypted or otherwise unsecured or validated using a shared secret between SPA subsystem 202 and SPI subsystem 250 (e.g., SPA-SPI key 155d) before re-securing SPY data 590 (e.g., with SPA key 157) for communication from SPA subsystem 202 to administration entity subsystem 400 as at least a portion of SPA value data 594.

At operation 546 of process 500, administration entity subsystem 400 may communicate at least SPV data 590 of SPA value data 594 as at least a portion of device SP value data 596 to an appropriate recipient electronic device (e.g., ordering or host electronic device 100 (as shown in FIG. 5) via communications path 25 using any suitable communications protocol or to client electronic device 100' (not shown in FIG. 5) via communications path 65 using any suitable communications protocol, where device 100' may be registered or associated with administration entity subsystem 400 in any suitable manner (e.g., at an operation similar to operation 504)). Administration entity subsystem 400 may identify the appropriate recipient electronic device as a target for such SPV data by identifying any suitable data from SPA value data 594, such as a device identifier of the recipient device. Device SP value data 596 may include any other suitable data along with SPV data 590 including, but not limited to, data identifying a funding credential (e.g., of option 325) for SPY data 590 and/or data identifying a funding amount (e.g., of option 329) for SPV data 590 and/or data identifying a target SP subsystem/SP credential for added value (e.g., of option 323 (e.g., an identifier of a particular SPI subsystem (e.g., SPI ID 267) and/or of a particular SPA subsystem (e.g., SPA ID 167) and/or an identifier of a recipient device (e.g., device identifier of host device 100 or of client device 100')) and/or an identifier of a particular SP credential existing on a device or to be provisioned on a device) of SPV data 590 and/or data identifying a particular value to be added (e.g., of option 327) by SPV data 590 and/or any other suitable information (e.g., any information identifying ordering device 100 itself, a unique device-based transaction or order identifier generated by ordering device 100, a unique administration-based transaction or order identifier generated by administration entity subsystem 400, a unique SPA-based transaction or order identifier generated by SPA subsystem 202, a unique SPI-based transaction or order identifier generated by SPI subsystem 250), and/or the like). In some embodiments, at least SPV data 590 of device SP value data 596 may be encrypted or otherwise secured using a shared secret between administration entity subsystem 400 and the recipient electronic device (e.g., key 155c and/or key 156k (e.g., for device 100)) prior to communicating device SP value data 596 to the recipient device at operation 546, such that SPV data 590 may be securely communicated from administration entity subsystem 400 without fear of being intercepted and used by an untrusted entity. In such embodiments, at least SPY data 590 of SPA value data 594 may first be decrypted or otherwise unsecured or validated using a shared secret between administration entity subsystem 400 and SPA subsystem 202 before re-securing SPV data 590 for communication from administration entity subsystem 400 as at least a portion of device SP value data 596. In some embodiments, as shown, such device SP value data 596 may be communicated at operation 546 to a secure element of the recipient electronic device (e.g., to secure element 145 of device 100). For example, at least a portion of device SP value data 596 (e.g., at least a portion of SPV data 590) as device SP value data 597 may be provisioned in an SP credential SSD (e.g., SP credential SSD 154a or a similar SSD) of secure element 145 or in any other suitable memory of device 100 at operation 547 (e.g., to store/add new SP value to the recipient device), and then update data 598 may be shared with processor 102 at operation 548 for indicating that such SPV data has been successfully provisioned on device 100, where any suitable application of device 100 (e.g., a credential management or wallet application running on processor 102) may utilize such update data 598 to present screen 190e of FIG. 3E to indicate with message 335 that the SP value add of an order has been a success (e.g., a new value of a particular SP credential on the recipient device due to the completed order may be indicated by message 335). Similar data may be forwarded on from device 100 to administration entity subsystem 400 to indicate the successful provisioning on device 100 to administration entity subsystem 400 and, possibly, from administration entity subsystem 400 to SP subsystem 200 to indicate the successful provisioning on device 100 to SP subsystem 200. Alternatively, in some embodiments, such device SP value data 596 may be communicated for storage on the recipient device other than at a secure element (e.g., as service provider credential data 123 that may be stored in memory 104 of device 100 and not in a secure element).

Once SPV data 590 has been successfully stored on a recipient device (e.g., as at least a portion of device SP value data 596, at operation 546 and/or operation 547), the order initiated at operation 510 may be complete. Then, the new SP credential value added to the recipient device may be used by the recipient device in any suitable manner to gain any suitable access to any suitable SP product. For example, device 100 may be the recipient device of SPV data 590 and may communicate to an appropriate target SP subsystem 200 at operation 549 any suitable SP access data 599 that may be at least partially based on SPV data 590 for gaining any suitable access to any suitable SP product of target SP subsystem 200. As shown, device 100 may utilize received SPY data 590 in any suitable manner for generating and communicating SP access data 599 to SPI subsystem 250 at operation 549 for use in gaining access to any suitable SP product associated with SPI subsystem 250. For example, device 100 may communicate SP access data 599 as contactless proximity-based communication 5 for receipt by SP subsystem 200 (e.g., from NFC component 120 for receipt by terminal 220 of SPI subsystem 250) and/or as any suitable online-based communication for receipt by SP subsystem 200 (e.g., from communications component 106 for receipt by SPI server 210 via communications path 15) and/or as any suitable data presented in any suitable way by device 100 for receipt by SP subsystem 200 (e.g., presentation of visual and/or audible and/or any other suitable data via an output component 112 of device 100 for receipt by any suitable scanner or other suitable sensing input component of SP subsystem 200 or an operator thereof (e.g., SP access data 599 may be presented as a particular QR code on a display output component 112 of device 100 that may be scanned by SP subsystem 200 for authenticating the SP value stored on device 100)) in order to grant access to any suitable SP product 599a at operation 549a to device 100 and/or its owner and/or its owner's associates (e.g., admission to a particular entertainment event or transportation event or acquisition of any suitable media data (e.g., for download or streaming to device 100) or the like). SP access data 599 may be provided as proof of a receipt of purchase of particular SP product access (e.g., proof of funding the device order) that may be redeemed for access to SP product 599a through communication of the SPY data as SP access data 599 with SP subsystem 200 (e.g., a receipt that may be presented by a user of device 100 to pick up a physical good of a service provider or to access a particular service of a service provider). Therefore, SPY data 590 may be any suitable data that may be stored on a recipient device to define at least a portion of service provider credential data that may then be provided by the recipient device as at least a portion of SP access data 599 to a service provider for gaining access to an SP product.

At any suitable moment(s) during process 500 for executing a device order between at least an ordering electronic device and a service provider issuer subsystem (e.g., after any suitable duration of time has occurred after a particular operation with no response receiver or after any suitable timer has elapsed), administration entity subsystem 400 may be operative to track the status of the device order for managing credentials on electronic devices and communications with a service provider on behalf of the electronic devices. For example, administration order data 570 communicated from administration entity subsystem 400 to SP subsystem 200 (e.g., SPA subsystem 202) at operation 522 may include order data for initiating a new order with SP subsystem 200. In addition to SP subsystem 200 processing such an order of order data 570 for attempting to fund new SP credential data for provisioning on a recipient electronic device (e.g., at operations 524, 526, 528, 528a, 540, 542, and/or 544, as described above), SP subsystem 200 may be operative to respond to such an order of order data 570 with an order confirmation that may be in the form of a purchase object shared with administration entity subsystem 400. For example, as shown, at operation 536 of process 500, SP subsystem 200 (e.g., SPA subsystem 202) may be operative to generate and communicate SPA order purchase object data 586 to administration entity subsystem 400, where SPA order purchase object data 586 (e.g., order status update data) may be communicated as responsive to the order provided by administration entity subsystem 400 to SP subsystem 200 as administration order data 570 at operation 522 or as responsive to any subsequent administration status update request for that order as may be provided by administration update request data 580 to SP subsystem 200 from administration entity subsystem 400 at operation 530 (e.g., at any suitable moment after the order has been initially provided to SP subsystem 200 at operation 522) or such purchase object data may be provided by SP subsystem 200 without being responsive to a particular request from administration entity subsystem 400.

An order status request of administration order data 570 and/or of any such administration update request data 580 may include any suitable data that may be uniquely indicative of the order being processed (e.g., data identifying a funding credential (e.g., of option 325) and/or data identifying a funding amount (e.g., of option 329) and/or data identifying a target SP subsystem/SP credential for added value (e.g., of option 323 (e.g., an identifier of a particular SPI subsystem (e.g., SPI ID 267) and/or of a particular SPA subsystem (e.g., SPA ID 167) and/or an identifier of a recipient device (e.g., device identifier of host device 100 or of client device 100')), etc.) and/or data identifying a particular value to be added (e.g., of option 327) and/or any other suitable information (e.g., any information identifying ordering device 100 itself, a unique device-based transaction or order identifier generated by ordering device 100, a unique administration-based transaction or order identifier generated by administration entity subsystem 400, a unique SPA-based transaction or order identifier generated by SPA subsystem 202, and/or the like), and SPA order purchase object data 586 that may be communicated as responsive to such an order status request may also include any suitable information that may be uniquely indicative of the order being processed (e.g., with respect to administration entity subsystem 400, such that administration entity subsystem 400 may be operative to track multiple different orders with the same SP subsystem and/or with different SP subsystems at the same time). For example, SPA order purchase object data 586 may include a unique identifier that may be unique across all orders/transactions (e.g., a unique SPA-based transaction or order identifier generated by SPA subsystem 202 and/or a unique administration-based transaction or order identifier generated by administration entity subsystem 400 and/or a unique device-based transaction or order identifier generated by ordering device 100) as well as an order state (e.g., information indicative of the current state of the order being processed, such as "pending" (e.g., a state of the order between receipt at operation 524 and sharing of SPV data 590 at operation 544), "complete" (e.g., a state of the order after sharing SPV data 590 at operation 544 or after confirmed provisioning of the same on the recipient device), or "failed" (e.g., a state of the order if the funding credential of the order data failed to be authenticated or approved for funding the order (e.g., at operation 528 and/or operation 528*a*))), a state message (e.g., any suitable system-generated message that may describe the current state (e.g., details about the order state, such as why it failed or when it was completed, etc.)), and/or an array of one or more available actions that can be performed on the order based on the current (e.g., based on the current order state identified by the purchase object) as may be determined by SPA subsystem 202 (e.g., an available action may be "cancel" if the current order state is "pending" such that administration entity subsystem 400 may respond to the purchase object by instructing SPA subsystem 202 to cancel the pending order). For example, if a purchase object of SPA order purchase object data 586 received by administration entity subsystem 400 includes an order state of "pending" and an available action of "cancel" at operation 536, then administration entity subsystem 400 may respond with an instruction to SPA subsystem 202 to cancel the pending order (e.g., a cancel action for the uniquely identified order of the purchase object of SPA order purchase object data 586 may be returned to SPA subsystem 202, which may instruct SPA subsystem 202 to cancel the order (e.g., by communicating an instruction to SPI subsystem 250) and to send an updated purchase object of new SPA order purchase object data 586 with an order state that has been updated from "pending" to "cancelled" accordingly. SPA subsystem 202 may receive an order status request of administration order data 570 at operation 522 and/or of administration update request data 580 at operation 530 from administration entity subsystem 400 and then communicate with SPI subsystem 250 of the order at operations 532 and 534 before generating and communicating a purchase object of SPA order purchase object data 586 at operation 536. For example, SPA subsystem 202 may communicate SPA update request data 582 to SPI subsystem 250 at operation 532 that may request the current status of the identified order from SPI subsystem 250 and then SPI subsystem 250 may generate and communicate SPI order purchase object data 584 at operation 534 as responsive to the request that may include the current status of the identified order, which may then be used by SPA subsystem 202 to define at least a portion of the purchase object of SPA order purchase object data 586. In response to receiving any suitable SPA order purchase object data 586 at operation 536, administration entity subsystem 400 may be operative to generate and communicate associated device purchase object data 588 to device 100 (e.g., processor 102) at operation 538, where any suitable application of device 100 (e.g., a credential management or wallet application running on processor 102) may utilize such device purchase object data 588 to present screen 190*d* of FIG. 3D to indicate with message 333 that current order state of the order (e.g., as identified by order purchase object data 586). At least a portion of SPA order purchase object data 586 (e.g., a purchase object) may be encrypted or signed or otherwise secured by any suitable shared secret between SPA subsystem 202 and administration entity subsystem 400 (e.g., key 157) to prove that any order status received from SPA subsystem 202 may be trusted by administration entity subsystem 400 as authentic and may be used as proof of funding of an order (e.g., if the received order status is "completed"), even if the actual SPY data was not received by the recipient device, such that administration entity subsystem 400 may manage the liability for the funding and SPV data between the ordering device and the SP subsystem (e.g., by keeping track of all purchase objects and SPV data communicated with respect to a particular order transaction). Therefore, purchase object data may be communicated between SP subsystem 200 and ordering device 100 and/or any recipient device via administration entity subsystem 400 (e.g., at any suitable number of iterations of operations 530-538) for tracking the status of a device order (e.g., for updating status at administration entity subsystem 400 and/or at device 100 (e.g., at any suitable application of device 100 (e.g., a credential management or wallet application running on processor 102))) in parallel with the generation and communication of SPV data 590 from SP subsystem 200 to the recipient device (e.g., device 100 or device 100') via administration entity subsystem 400 (e.g., at any suitable number of iterations of operations 524-528 and 540-598) for actually adding value to a recipient device for fulfilling the device order.

Any suitable API(s) may be used between any two communicating entities of system 1. Administration entity subsystem 400 may call an API endpoint with a status request of data 570 and/or data 580 to retrieve a current state of a particular order, and the API response to the call may be the purchase object of SPA order purchase object data 586 from SPA subsystem 202. Such an API used by administration entity subsystem 400 with SP subsystem 200 may be a continuation of an API that may originate from ordering device 100 (e.g., from a credential management or other suitable application running on processor 102) for communicating device order data with administration entity subsystem 400. Any data communicated between administration entity subsystem 400 and SPA subsystem 202 may be communicated inside a file of any suitable type and/or structure, such as a JavaScript Object Notation ("JSON") file or dictionary, where string encoding may be carried out in any suitable manner, such as UTF-8 string encoding. For example, SPA order purchase object data 586 may be a purchase object (e.g., any suitable confirmation of the order status request) that may be represented by a JSON dictionary with key purchase. In some embodiments, a particular key, such as a "statusCode" key, may be an optional key that may be defined within a response header (e.g., a response header JSON data structure) that may be included in one, some, or all API response. If a request was successfully processed and no errors occurred, then such a "statusCode" key may not be included in the response header. However, if such a "statusCode" key is present in a response header, the receiving server may be operative to determine that it need not parse the remainder of the data (e.g., the remainder of the JSON data structure). For example, if an error were to occur in the processing of a device order or a device order status request, a purchase object may be absent from the structure (e.g., JSON data structure) of SPA order purchase object data 586.

It is understood that the operations shown in process 500 of FIG. 5 are only illustrative and that existing operations may be modified or omitted, additional operations may be added, and the order of certain operations may be altered. Therefore, a device order may be generated using a funding credential on a secure element of ordering device 100 and may fund the addition of new SP value on that same secure element of ordering device 100 and/or on a secure element or otherwise of another recipient device from remote SP subsystem 200. Administration entity subsystem 400 may perform a central role in the entire transaction by acting as a conduit for all communications between SP subsystem 200 and ordering device 100 and any recipient device, which may enable administration entity subsystem 400 to act as a trusted service manager for securely communicating sensitive credential data amongst the subsystems by using one or more shared secrets available to administration entity subsystem 400 and one or more of the other subsystems/devices. In some embodiments, administration entity subsystem 400 may be the only subsystem in system 1 that may be operative to securely communicate credential data (e.g., cryptographically communicate SP credential data and/or financial institution credential data) onto and/or from a secure element of host device 100 and/or of client device 100', such that administration entity subsystem 400 may act as a gatekeeper for all order transaction data communicated between an SP subsystem and one or more user electronic devices during process 500. Therefore, administration entity subsystem 400 may be configured to provide a new layer of security and/or to provide a more seamless user experience when a credential is being provisioned on device 100 and/or when such a provisioned credential is being used as part of a credential data communication between device 100 and service provider subsystem 200 for funding an order transaction.

FIG. 6 is a flowchart of an illustrative process 600 for managing a secure transaction (e.g., order). At operation 602 of process 600, an administration entity subsystem may receive, from an electronic device, device order data indicative of an order for value of a service provider subsystem to be stored on the electronic device (e.g., administration entity subsystem 400 may receive device order data 568 from electronic device 100). At operation 604 of process 600, the administration entity subsystem may transmit, to the service provider subsystem, administration order data that may include at least a portion of the device order data indicative of the order (e.g., administration entity subsystem 400 may communicate administration order data 570 to service provider subsystem 200). At operation 606 of process 600, the administration entity subsystem may receive, from the service provider subsystem, order status update data indicative of a status of the fulfillment of the order for the value by the service provider subsystem (e.g., administration entity subsystem 400 may receive order purchase object data 586 from SP subsystem 200). At operation 608 of process 600, the administration entity subsystem may verify the received order status update data using a shared secret of the administration entity and the service provider subsystem (e.g., administration entity subsystem 400 may confirm the validity (e.g., the source of order purchase object data 586) using a shared secret between administration entity subsystem 400 and SP subsystem 200 (e.g., using key 157)). The verifying may include at least one of decrypting, decoding, and unsigning at least a portion of the received order status update data using the shared secret, where the shared secret may include data shared between the administration entity and the service provider subsystem (e.g., at the registration of operation 502 of process 500) prior to the receiving the order status update data. After the verifying, the administration entity subsystem may transmit, to the electronic device, at least a portion of the received order status update data (e.g., administration entity subsystem 400 may communicate object data 588). The administration entity subsystem may also receive, from the service provider subsystem, order fulfillment data including the value of the order (e.g., administration entity subsystem 400 may receive value data 594) and may transmit at least a portion of the value to the electronic device (e.g., to secure element 145 as value data 596), where the value may enable the electronic device to access a product of the service provider subsystem (e.g., device 100 may use value data 596 to access product 599$a$). The administration entity subsystem may decrypt a portion of the received device order data using a shared secret of the administration entity and the electronic device and then re encrypt the portion of the received device order data using a shared secret of the administration entity and the service provider subsystem, wherein the administration order data (e.g., of operation 604) may include the re-encrypted portion of the received device order data, which may include payment data operative to fund the fulfillment of the order (e.g., payment data 564).

It is understood that the operations shown in process 600 of FIG. 6 are only illustrative and that existing operations may be modified or omitted, additional operations may be added, and the order of certain operations may be altered.

As mentioned, electronic device 100 can include, but is not limited to, a music player (e.g., an iPod™ available by Apple Inc. of Cupertino, Calif.), video player, still image player, game player, other media player, music recorder, movie or video camera or recorder, still camera, other media recorder, radio, medical equipment, domestic or commercial appliance, transportation vehicle instrument, musical instrument, calculator, cellular telephone (e.g., an iPhone™ available by Apple Inc.), other wireless communication device, personal digital assistant, remote control, pager, computer (e.g., a desktop, laptop, tablet (e.g., an iPad™ available by Apple Inc.), server, etc.), monitor, television, stereo equipment, set up box, set-top box, modem, router, printer, or any combination thereof. In some embodiments, electronic device 100 may perform a single function (e.g., a device dedicated to conducting device orders for SP value) and, in other embodiments, electronic device 100 may perform multiple functions (e.g., a device that conducts device orders for SP value, plays music, and receives and transmits telephone calls). Electronic device 100 may be any portable, mobile, hand-held, or miniature electronic device that may be configured to conduct device orders for SP value wherever a user travels. Some miniature electronic devices may have a form factor that is smaller than that of hand-held electronic devices, such as an iPod™. Illustrative miniature electronic devices can be integrated into various objects that may include, but are not limited to, watches (e.g., an Apple Watch™ by Apple Inc.), rings, necklaces, belts, accessories for belts, headsets, accessories for shoes, virtual reality devices, glasses, other wearable electronics, accessories for sporting equipment, accessories for fitness equipment, key chains, or any combination thereof. Alternatively, electronic device 100 may not be portable at all, but may instead be generally stationary.

Memory 104 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may be fixedly embedded within electronic device 100 or may be incorporated on one or more suitable types of cards that may be repeatedly inserted into and removed from electronic device 100 (e.g., a subscriber identity module ("SIM") card or secure digital ("SD") memory card). Communications component 106 may be referred to as an online communications component when operative to communicate any suitable data to any remote server or other suitable entity (e.g., to any suitable internet connection). Communications component 106 may be configured to determine a geographical position of electronic device 100. For example, communications component 106 may utilize the global positioning system ("GPS") or a regional or site-wide positioning system that may use cell tower positioning technology or Wi-Fi technology.

One or more input components 110 may be provided to permit a user to interact or interface with device 100. For example, input component 110 can take a variety of forms, including, but not limited to, a touch pad, dial, click wheel, scroll wheel, touch screen, one or more buttons (e.g., a keyboard), mouse, joy stick, track ball, microphone, camera, scanner (e.g., a bar code scanner or any other suitable scanner that may obtain product identifying information from a code, such as a bar code, a QR code, or the like), proximity sensor, light detector, motion sensor, biometric sensor (e.g., a fingerprint reader or other feature recognition sensor, which may operate in conjunction with a feature-processing application that may be accessible to electronic device 100 for authenticating a user), and combinations thereof. Each input component 110 can be configured to provide one or more dedicated control functions for making selections or issuing commands associated with operating device 100.

Electronic device 100 may also include one or more output components 112 that may present information (e.g., graphical, audible, and/or tactile information) to a user of device 100. For example, output component 112 of electronic device 100 may take various forms, including, but not limited to, audio speakers, headphones, audio line-outs, visual displays, antennas, infrared ports, haptic output components (e.g., rumblers, vibrators, etc.), or combinations thereof.

Processor 102 of electronic device 100 may include any processing circuitry that may be operative to control the operations and performance of one or more components of electronic device 100. For example, processor 102 may receive input signals from input component 110 and/or drive output signals through output component 112. As shown in FIG. 2, processor 102 may be used to run one or more applications, such as an application 103, an application 113, and/or an application 143. Each application 103/113/143 may include, but is not limited to, one or more operating system applications, firmware applications, media playback applications, media editing applications, NFC low power mode applications, biometric feature-processing applications, or any other suitable applications. For example, processor 102 may load application 103/113/143 as a user interface program to determine how instructions or data received via an input component 110 or other component of device 100 may manipulate the way in which information may be stored and/or provided to the user via an output component 112. Application 103/113/143 may be accessed by processor 102 from any suitable source, such as from memory 104 (e.g., via bus 118) or from another device or server (e.g., via communications component 106). Processor 102 may include a single processor or multiple processors. For example, processor 102 may include at least one "general purpose" microprocessor, a combination of general and special purpose microprocessors, instruction set processors, graphics processors, video processors, and/or related chips sets, and/or special purpose microprocessors. Processor 102 also may include on board memory for caching purposes.

Electronic device 100 may also include near field communication ("NFC") component 120. NFC component 120 may be any suitable proximity-based communication mechanism that may enable contactless proximity-based transactions or communications between electronic device 100 and service provider subsystem 200 (e.g., service provider payment terminal 220). NFC component 120 may allow for close range communication at relatively low data rates (e.g., 424 kbps), and may comply with any suitable standards, such as ISO/IEC 7816, ISO/IEC 18092, ECMA-340, ISO/IEC 21481, ECMA-352, ISO 14443, and/or ISO 15693. Alternatively, or additionally, NFC component 120 may allow for close range communication at relatively high data rates (e.g., 370 Mbps), and may comply with any suitable standards, such as the TransferJet™ protocol. Communication between NFC component 120 and service provider subsystem 200 may occur within any suitable close range distance between the NFC component and service provider subsystem 200 (see, e.g., distance D of FIG. 1 between NFC component 120 and service provider payment terminal 220), such as a range of approximately 2 to 4 centimeters, and may operate at any suitable frequency (e.g., 13.56 MHz). For example, such close range communication of an NFC component may take place via magnetic field induction, which may allow the NFC component to communicate with other NFC devices and/or to retrieve information from tags having radio frequency identification ("RFID") circuitry. Such an NFC component may provide a manner of acquiring merchandise information, transferring payment information, and otherwise communicating with an external device (e.g., communicating between NFC component 120 and service provider terminal 220).

NFC controller module 140 and NFC memory module 150 may independently or in combination provide at least a portion of a secure element 145, which may be tamper resistant. For example, such a secure element 145 may be configured to provide a tamper-resistant platform (e.g., as a single or multiple chip secure microcontroller) that may be capable of securely hosting applications and their confidential and cryptographic data (e.g., applet 153 and key 155) in accordance with rules and security requirements that may be set forth by a set of well-identified trusted authorities (e.g., an authority of financial institution subsystem and/or an industry standard, such as GlobalPlatform). NFC memory module 150 may be a portion of memory 104 or at least one dedicated chip specific to NFC component 120. NFC memory module 150 may reside on a SIM, a dedicated chip on a motherboard of electronic device 100, or as an external plug in memory card. NFC memory module 150 may be completely independent from NFC controller module 140 and may be provided by different components of device 100 and/or provided to electronic device 100 by different removable subsystems. Secure element 145 may be a highly secure, tamper-resistant hardware component within a chip, which may be used for storing sensitive data or applications on electronic device 100. At least a portion of secure element 145 may be provided in a removable circuit card, such as a universal integrated circuit card ("UICC") or a subscriber identity module ("SIM") card, that may be used in electronic devices 100 compatible within global system for mobile communications ("GSM") networks, universal mobile telecommunications systems ("UMTS") and/or long-term evolution ("LTE") standard networks. Alternatively, or additionally, at least a portion of secure element 145 may be provided in an integrated circuit that may be embedded into electronic device 100 during manufacturing of device 100. Alternatively, or additionally, at least a portion of secure element 145 may be provided in a peripheral device that can be plugged into, inserted into, or otherwise coupled to electronic device 100, such as a micro secure digital ("SD") memory card.

Service provider terminal 220 of service provider subsystem 200 of FIG. 1 may include a reader for detecting, reading, or otherwise receiving an NFC communication from electronic device 100 (e.g., communication 5 when device 100 comes within a certain distance or proximity of terminal 220). Accordingly, it is noted that an NFC communication between such a service provider terminal and electronic device 100 may occur wirelessly and, as such, may not require a clear "line of sight" between the respective devices. As mentioned, NFC device module 130 may be passive or active. When passive, NFC device module 130 may only be activated when within a response range of a suitable reader of such a service provider terminal. For instance, a reader of such a service provider terminal may emit a relatively low-power radio wave field that may be used to power an antenna utilized by NFC device module 130 (e.g., shared antenna 116 or NFC-specific antenna 134) and, thereby, enable that antenna to transmit suitable NFC communication information from NFC data module 132, via antenna 116 or antenna 134, to such a service provider terminal as an NFC communication. When active, NFC device module 130 may incorporate or otherwise have access to a power source local to electronic device 100 (e.g., power supply 108) that may enable shared antenna 116 or NFC-specific antenna 134 to actively transmit NFC communication information from NFC data module 132, via antenna 116 or antenna 134, to service provider terminal 220 as an NFC communication, rather than reflect radio frequency signals, as in the case of a passive NFC device module 130. Service provider terminal 220 may be provided by a service provider of service provider subsystem 200 (e.g., in a store of the service provider for selling products or services directly to the user of device 100 at the store). While NFC component 120 has been described with respect to near field communication, it is to be understood that component 120 may be configured to provide any suitable contactless proximity-based mobile payment or any other suitable type of contactless proximity-based communication between electronic device 100 and such a service provider terminal. For example, NFC component 120 may be configured to provide any suitable short-range communication, such as those involving electromagnetic/electrostatic coupling technologies. Alternatively, in some embodiments, NFC component 120 of device 100 may be configured to include any suitable components for enabling data available to processor 102 or any other part of device 100 to be communicated as any suitable contactless proximity-based communication 5 between NFC component 120 of device 100 and terminal 220 of service provider subsystem 200, but NFC component 120 may or may not include a secure element operative to securely store credential applets.

One, some, or all of the processes described with respect to FIGS. 1-6 may each be implemented by software, but may also be implemented in hardware, firmware, or any combination of software, hardware, and firmware. Instructions for performing these processes may also be embodied as machine- or computer-readable code recorded on a machine- or computer-readable medium. In some embodiments, the computer-readable medium may be a non-transitory computer-readable medium. Examples of such a non-transitory computer-readable medium include but are not limited to a read-only memory, a random-access memory, a flash memory, a CD-ROM, a DVD, a magnetic tape, a removable memory card, and a data storage device (e.g., memory 104 and/or memory module 150 of FIG. 2). In other embodiments, the computer-readable medium may be a transitory computer-readable medium. In such embodiments, the transitory computer-readable medium can be distributed over network-coupled computer systems so that the computer-readable code is stored and executed in a distributed fashion. For example, such a transitory computer-readable medium may be communicated from one electronic device to another electronic device using any suitable communications protocol (e.g., the computer-readable medium may be communicated to electronic device 100 via communications component 106 (e.g., as at least a portion of an application 103 and/or as at least a portion of an application 113 and/or as at least a portion of an application 143)). Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any, each, or at least one module or component or subsystem of system 1 may be provided as a software construct, firmware construct, one or more hardware components, or a combination thereof. For example, any, each, or at least one module or component or subsystem of system 1 may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules and components and subsystems of system 1 are only illustrative, and that the number, configuration, functionality, and interconnection of existing modules, components, and/or subsystems may be modified or omitted, additional modules, components, and/or subsystems may be added, and the interconnection of certain modules, components, and/or subsystems may be altered.

At least a portion of one or more of the modules or components or subsystems of system 1 may be stored in or otherwise accessible to an entity of system 1 in any suitable manner (e.g., in memory 104 of device 100 (e.g., as at least a portion of an application 103 and/or as at least a portion of an application 113 and/or as at least a portion of an application 143)). For example, any or each module of NFC component 120 may be implemented using any suitable technologies (e.g., as one or more integrated circuit devices), and different modules may or may not be identical in structure, capabilities, and operation. Any or all of the modules or other components of system 1 may be mounted on an expansion card, mounted directly on a system motherboard, or integrated into a system chipset component (e.g., into a "north bridge" chip).

Any or each module or component of system 1 (e.g., any or each module of NFC component 120) may be a dedicated system implemented using one or more expansion cards adapted for various bus standards. For example, all of the modules may be mounted on different interconnected expansion cards or all of the modules may be mounted on one expansion card. With respect to NFC component 120, by way of example only, the modules of NFC component 120 may interface with a motherboard or processor 102 of device 100 through an expansion slot (e.g., a peripheral component interconnect ("PCI") slot or a PCI express slot). Alternatively, NFC component 120 need not be removable but may include one or more dedicated modules that may include memory (e.g., RAM) dedicated to the utilization of the module. In other embodiments, NFC component 120 may be integrated into device 100. For example, a module of NFC component 120 may utilize a portion of device memory 104 of device 100. Any or each module or component of system 1 (e.g., any or each module of NFC component 120) may include its own processing circuitry and/or memory. Alternatively, any or each module or component of system 1 (e.g., any or each module of NFC component 120) may share processing circuitry and/or memory with any other module of NFC component 120 and/or processor 102 and/or memory 104 of device 100.

While there have been described systems, methods, and computer-readable media for managing secure transactions between electronic devices and service providers, it is to be understood that many changes may be made therein without departing from the spirit and scope of the subject matter described herein in any way. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the invention can be practiced by other than the described embodiments, which are presented for purposes of illustration rather than of limitation.

What is claimed is:

1. A method comprising:
at an administration entity subsystem:
receiving, from an electronic device, device order data indicative of an order for an item of value provided by a service provider subsystem that is to be stored on the electronic device, the device order data comprising payment data for fulfillment of the order, and the service provider subsystem being separate from the administration entity subsystem;
transmitting, to the service provider subsystem and in response to receiving the device order data from the electronic device, administration order data that comprises at least a portion of the device order data, wherein the portion of the device order data comprises the payment data for fulfillment of the order, the payment data being representative of a payment instrument;
receiving, from the service provider subsystem and responsive to transmitting the administration order data to the service provider subsystem, order fulfillment data that comprises the item of value provided by the service provider subsystem; and
responsive to receiving the order fulfillment data from the service provider subsystem, transmitting the item of value to the electronic device, wherein the transmitting the item of value comprises at least one of: provisioning an applet corresponding to the item of value on a secure element of the electronic device with a particular funding amount that is locally stored in the applet on the secure element or changing a funding amount stored in a previously provisioned applet on the secure element of the electronic device.

2. The method of claim 1, further comprising:
receiving, from the service provider subsystem, order status update data indicative of a fulfillment status of the order; and
verifying the received order status update data,
wherein the verifying comprises at least one of decrypting, decoding, or unsigning at least a portion of the received order status update data using a shared secret known to both the administration entity subsystem and the service provider subsystem.

3. The method of claim 2, wherein the shared secret comprises data shared between the administration entity subsystem and the service provider subsystem prior to the receiving the order status update data.

4. The method of claim 2, further comprising, after the verifying, transmitting, to the electronic device, at least a portion of the received order status update data.

5. The method of claim 1, wherein the transmitted item of value enables the electronic device to access a product of the service provider subsystem.

6. The method of claim 1, wherein transmitting the item of value to the electronic device comprises changing, by the administration entity subsystem, the funding amount stored on the previously provisioned applet on the secure element of the electronic device, wherein the order fulfillment data indicates the funding amount.

7. The method of claim 1, further comprising:
after receiving the device order data, decrypting, at the administration entity subsystem, a portion of the received device order data using a shared secret of the administration entity subsystem and the electronic device; and
re-encrypting, at the administration entity subsystem, the portion of the received device order data using a shared secret of the administration entity subsystem and the service provider subsystem, wherein the administration order data comprises the re-encrypted portion of the received device order data.

8. The method of claim 7, wherein the portion of the received device order data comprises the payment data.

9. The method of claim 2, wherein the order status update data received from the service provider subsystem indicates that the item of value has not been provided by the service provider subsystem to the electronic device.

10. The method of claim 2, wherein verifying the received order status update data comprises verifying the received order status update data using data not available to the electronic device.

11. A device comprising:
a memory; and
at least one processor configured to:
receive, by an administration entity subsystem and from an electronic device, device order data indicative of an order for an item of value provided by a service provider subsystem that is to be stored on the electronic device, the device order data comprising payment data for fulfillment of the order, and the service provider subsystem being separate from the administration entity subsystem;
transmit, by the administration entity subsystem, to the service provider subsystem and in response to receiving the device order data from the electronic device, administration order data that comprises at least a portion of the device order data, wherein the portion of the device order data comprises the payment data for fulfillment of the order, the payment data being representative of a payment instrument;
receive, by the administration entity subsystem, from the service provider subsystem and responsive to transmitting the administration order data to the service provider subsystem, order fulfillment data that comprises the item of value provided by the service provider subsystem; and
transmit, by the administration entity subsystem and responsive to receiving the order fulfillment data from the service provider subsystem, the item of value to the electronic device, wherein the transmit of the item of value comprises at least one of: provisioning an applet corresponding to the item of value on a secure element of the electronic device with a particular funding amount that is locally stored in the applet on the secure element or changing a funding amount stored in a previously provisioned applet on the secure element of the electronic device.

12. The device of claim 11, wherein the transmitted item of value enables the electronic device to access a product of the service provider subsystem.

13. The device of claim 11, wherein the transmit comprises provisioning, by the administration entity subsystem onto the secure element of the electronic device, the applet corresponding to the item of value with the particular funding amount, wherein the order fulfillment data indicates the particular funding amount.

14. The device of claim 11, wherein the at least one processor is further configured to:
after receipt of the device order data, decrypt, by the administration entity subsystem, a portion of the received device order data using a shared secret of the administration entity subsystem and the electronic device; and
re-encrypt, by the administration entity subsystem, the portion of the received device order data using a shared secret of the administration entity subsystem and the service provider subsystem, wherein the administration order data comprises the re-encrypted portion of the received device order data and the portion of the received device order data comprises the payment data.

15. A non-transitory machine-readable medium comprising instructions that, when executed by one or more processors, cause the one or more processors to perform operations comprising:
receiving, by an administration entity subsystem and from an electronic device, device order data indicative of an order for an item of value provided by a service provider subsystem that is to be stored on the electronic device, the device order data comprising payment data for fulfillment of the order, and the service provider subsystem being separate from the administration entity subsystem;
transmitting, by the administration entity subsystem, to the service provider subsystem and in response to receiving the device order data from the electronic device, administration order data that comprises at least a portion of the device order data, wherein the portion of the device order data comprises the payment data for fulfillment of the order, the payment data being representative of a payment instrument;
receiving, by the administration entity subsystem, from the service provider subsystem and responsive to transmitting the administration order data to the service provider subsystem, order fulfillment data that comprises the item of value provided by the service provider subsystem; and
transmitting, by the administration entity subsystem and responsive to receiving the order fulfillment data from the service provider subsystem, the item of value to the electronic device, wherein the transmitting the item of value comprises at least one of: provisioning an applet corresponding to the item of value on a secure element of the electronic device with a particular funding amount that is locally stored in the applet on the secure element or changing a funding amount stored in a previously provisioned applet on the secure element of the electronic device.

16. The non-transitory machine-readable medium of claim 15, wherein the transmitted item of value enables the electronic device to access a product of the service provider subsystem.

17. The non-transitory machine-readable medium of claim 15, wherein the transmitting comprises:
provisioning, by the administration entity subsystem onto the secure element of the electronic device, the applet corresponding to the item of value with the particular funding amount, wherein the order fulfillment data indicates the particular funding amount.

18. The non-transitory machine-readable medium of claim 15, wherein the operations further comprise:
after receiving the device order data, decrypting, by the administration entity subsystem, a portion of the received device order data using a shared secret of the administration entity subsystem and the electronic device; and
re-encrypting, by the administration entity subsystem, the portion of the received device order data using a shared secret of the administration entity subsystem and the service provider subsystem, wherein the administration order data comprises the re-encrypted portion of the received device order data and the portion of the received device order data comprises the payment data.

19. The method of claim 6, wherein the previously provisioned applet was previously provisioned on the secure element of the electronic device by the service provider subsystem, and the funding amount comprises stored value redeemable directly from the previously provisioned applet for a service associated with service provider subsystem.

20. The method of claim 1, wherein the transmitting the item of value comprises provisioning the applet corresponding to the item of value on the secure element of the electronic device with the particular funding amount that is locally stored in the applet on the secure element, the funding amount comprising a stored value redeemable directly from the applet for a service associated with the service provider subsystem.

* * * * *